United States Patent
Yang et al.

(10) Patent No.: US 11,444,737 B2
(45) Date of Patent: Sep. 13, 2022

(54) COMMUNICATION METHOD AND DEVICE

(71) Applicant: Huawei Technologies Co., Ltd., Shenzhen (CN)

(72) Inventors: Yubo Yang, Shanghai (CN); Peng Zhang, Shanghai (CN); Xiaolei Tie, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 78 days.

(21) Appl. No.: 16/719,413

(22) Filed: Dec. 18, 2019

(65) Prior Publication Data

US 2020/0145165 A1    May 7, 2020

Related U.S. Application Data

(63) Continuation of application No. PCT/CN2018/095535, filed on Jul. 13, 2018.

(30) Foreign Application Priority Data

Jul. 14, 2017 (CN) .......................... 201710575692.6

(51) Int. Cl.
 H04L 5/00  (2006.01)
 H04L 1/18  (2006.01)
 H04W 28/02 (2009.01)

(52) U.S. Cl.
 CPC .......... *H04L 5/0053* (2013.01); *H04L 1/1812* (2013.01); *H04L 1/1861* (2013.01); *H04L 5/0044* (2013.01); *H04W 28/0263* (2013.01)

(58) Field of Classification Search
 CPC ... H04W 28/04; H04W 72/04; H04W 72/042; H04W 88/08; H04W 28/0263;
 (Continued)

(56) References Cited

U.S. PATENT DOCUMENTS

| 2013/0064216 A1* | 3/2013 | Gao ...................... H04L 5/0053 |
| | | 370/330 |
| 2014/0044056 A1* | 2/2014 | Chen ..................... H04L 1/1812 |
| | | 370/329 |
| 2014/0314007 A1* | 10/2014 | Chen .................... H04B 7/0689 |
| | | 370/329 |

(Continued)

FOREIGN PATENT DOCUMENTS

| CN | 101500259 A | 8/2009 |
| CN | 103929266 A | 7/2014 |

(Continued)

OTHER PUBLICATIONS

3rd Generation Partnership Project; Technical Specification Group GSM/EDGE Radio Access Network; Cellular system support for ultra-low complexity and low throughput Internet of Things (CIoT) (Release 13), 3GPP TR 45.820 V13.1.0 (Nov. 2015), 495 pages.

(Continued)

*Primary Examiner* — Peter G Solinsky
*Assistant Examiner* — Sanjay K Dewan
(74) *Attorney, Agent, or Firm* — Slater Matsil, LLP

(57) ABSTRACT

This application provides a communication method and apparatus. The method includes: implicitly indicating a quantity of time units for transmitting a data channel and a quantity of times of retransmission of the data channel by using a size of a resource for transmitting a control channel.

22 Claims, 7 Drawing Sheets

(58) Field of Classification Search
CPC ... H04L 5/0007; H04L 5/0053; H04L 5/0044; H04L 1/1812; H04L 1/1861
USPC .......................................................... 370/329
See application file for complete search history.

(56) References Cited

U.S. PATENT DOCUMENTS

| | | | |
|---|---|---|---|
| 2015/0131579 A1 | 5/2015 | Li et al. | |
| 2015/0139104 A1* | 5/2015 | Seo ..................... | H04L 5/0053 370/329 |
| 2015/0181577 A1* | 6/2015 | Moulsley ............. | H04L 5/0053 370/329 |
| 2016/0100382 A1* | 4/2016 | He ....................... | H04L 5/0094 370/329 |
| 2016/0219587 A1* | 7/2016 | Lin ...................... | H04L 5/0044 |
| 2016/0381712 A1* | 12/2016 | Yang .................. | H04W 72/0446 370/329 |
| 2018/0198650 A1* | 7/2018 | Nogami ............... | H04L 5/0094 |
| 2018/0324789 A1* | 11/2018 | Park .................... | H04W 72/048 |
| 2019/0357198 A1* | 11/2019 | Xiong ................. | H04W 72/048 |
| 2021/0377951 A1* | 12/2021 | Khoshnevisan .... | H04W 72/042 |

FOREIGN PATENT DOCUMENTS

| | | | | |
|---|---|---|---|---|
| CN | 104518843 A | 4/2015 | | |
| CN | 105850058 A | 8/2016 | | |
| CN | 105917598 A | 8/2016 | | |
| CN | 106717030 A * | 5/2017 | ............ | H04W 28/04 |
| EP | 3051728 A1 | 8/2016 | | |
| SG | WO 2016/119232 A1 * | 8/2016 | ............... | H04L 1/00 |
| WO | 2015046830 A1 | 4/2015 | | |
| WO | 2015096154 A1 | 7/2015 | | |
| WO | 2016119232 A1 | 8/2016 | | |
| WO | 2017119467 A1 | 7/2017 | | |

OTHER PUBLICATIONS

Wang, Xingliang et al., "Introduction to Communication System", Xi'an University of Electronic Science and Technology Press, Feb. 2008, 2 page.

You, Ya et al., "Design and performance research of E-PDCCH in LTE-A system", Modern Electronic Technology Mar. 1, 2015, 2 pages.

* cited by examiner

COMMUNICATION METHOD AND DEVICE

CROSS-REFERENCE TO RELATED APPLICATIONS

This application is a continuation of International Application No. PCT/CN2018/095535, filed on Jul. 13, 2018, which claims priority to Chinese Patent Application No. 201710575692.6, filed on Jul. 14, 2017. The disclosures of the aforementioned applications are hereby incorporated by reference in their entireties.

TECHNICAL FIELD

Embodiments of the present invention relate to the field of wireless communications, and in particular, to a communication method and device in a wireless communications system.

BACKGROUND

Mobile communications technologies have profoundly changed life of people, but the people never stop pursuit of mobile communications technologies with higher performance. To cope with explosive growth of mobile data traffic, massive connections of mobile communications devices, and continuous emergence of a variety of new services and application scenarios in the future, a fifth generation (5G) mobile communications system comes into being at the right moment. The International Telecommunication Union (ITU) defines three major application scenarios for 5G and a future mobile communications system: enhanced mobile broadband (eMBB), ultra-reliable low-latency communication (URLLC), and massive machine-type communications (mMTC).

Typical eMBB services include an ultra-high definition video, augmented reality (AR), virtual reality (VR), or the like. These services are mainly characterized by a large data transmission amount and a very high transmission rate. Typical URLLC services include tactile interaction applications such as wireless control in an industrial manufacturing or production process, motion control and remote repair of a self-driving car and an unmanned aerial vehicle, and remote medical surgery. These services are mainly characterized by requirements for ultra-high reliability and a low latency, a relatively small data transmission amount, and burstiness. Typical mMTC services include smart grid power distribution automation, a smart city, and the like that are mainly characterized by a huge quantity of web-connected devices, a relatively small data transmission amount, and insensitivity of data to a transmission latency. These mMTC terminals need to satisfy requirements for low costs and a very long standby time.

Different services have different requirements on a mobile communications system, and URLLC service data has an extremely high requirement for reliability and a latency. On the premise of reliability of 99.999%, a transmission latency should be within 1 ms. To improve reliability of URLLC service data, reliability of a control channel corresponding to a data channel for transmitting the URLLC service data needs to be improved.

SUMMARY

This application provides a communication method, to improve transmission reliability of a control channel by reducing a payload size of the control channel.

According to a first aspect, a communication method is provided. The method includes: determining, by a network device, a size of a resource for transmitting a control channel, where the control channel carries a first parameter, the first parameter is used to control transmission of data on a data channel, and a first mapping relationship exists between the size of the resource for transmitting the control channel and a quantity of times of retransmission of the data channel; and sending, by the network device, the control channel and the data channel. By using the method, the quantity of times of retransmission of the data channel does not need to be indicated to a terminal device through the control channel. Therefore, the payload size of the control channel is effectively reduced, and transmission efficiency and reliability of the control channel are improved.

In a possible implementation of the first aspect, the first mapping relationship is predefined, or the network device notifies the terminal device of the first mapping relationship by using a radio resource control message.

In a possible implementation of the first aspect, the size of the resource for transmitting the control channel is a quantity of control channel elements used to transmit the control channel, or a quantity of times of retransmission of the control channel, or a product of the quantity of the control channel elements used to transmit the control channel and the quantity of times of retransmission of the control channel.

In a possible implementation of the first aspect, when the quantity of the control channel elements used to transmit the control channel is greater than 1, the control channel elements belong to at least one control resource set.

In a possible implementation of the first aspect, the quantity of times of retransmission of the control channel is a quantity of times of retransmission of the control channel in time domain, or a quantity of times of retransmission of the control channel in frequency domain.

According to a second aspect, a communication method is provided. The method includes: determining, by a network device, a size of a resource for transmitting a control channel, where the control channel carries a first parameter, the first parameter is used to control transmission of data on a data channel, and a second mapping relationship exists between the size of the resource for transmitting the control channel and a quantity of time units for transmitting the data channel; and sending, by the network device, the control channel and the data channel. By using the method, the quantity of the time units for transmitting the data channel does not need to be indicated to a terminal device through the control channel. Therefore, the payload size of the control channel is effectively reduced, and transmission efficiency and reliability of the control channel are improved.

In a possible implementation of the second aspect, the second mapping relationship is predefined, or the network device notifies the terminal device of the second mapping relationship by using a radio resource control message.

In a possible implementation of the second aspect, the size of the resource for transmitting the control channel is a quantity of control channel elements used to transmit the control channel, or a quantity of times of retransmission of the control channel, or a product of the quantity of the control channel elements used to transmit the control channel and the quantity of times of retransmission of the control channel.

In a possible implementation of the second aspect, when the quantity of the control channel elements used to transmit the control channel is greater than 1, the control channel elements belong to at least one control resource set.

In a possible implementation of the second aspect, the quantity of times of retransmission of the control channel is a quantity of times of retransmission of the control channel in time domain, or a quantity of times of retransmission of the control channel in frequency domain.

According to a third aspect, a communication method is provided. The method includes: determining, by a network device, first control information, where the first control information is used to control transmission of data on a data channel; determining, by the network device, a size of a resource for transmitting a control channel, where the control channel is used to carry second control information; and determining, by the network device, the second control information based on the size of the resource and the first control information; and sending, by the network device, the second control information on the control channel.

Because the size of the resource for transmitting the control channel reflects transmission quality of the data channel to some extent, the size of the resource for transmitting the control channel may further be used to reduce a quantity of bits used to indicate the first control information, that is, reduce a quantity of bits of the second control information in the control channel. In the control information transmission method, the second control information is determined based on the size of the resource for transmitting the control channel and the first control information, so that the quantity of bits of the second control information can be effectively reduced. On a premise that a transmission resource of the control channel is fixed, transmission reliability of the control channel can be improved. On a premise that transmission reliability is fixed, the transmission resource of the control channel can be reduced, and transmission efficiency can be improved.

In a possible implementation of the third aspect, the first control information includes a first modulation and coding scheme (MCS) index, the second control information includes first indication information, the first indication information is used to indicate a second MCS index, and the network device determines the second MCS index based on the size of the resource for transmitting the control channel and the first MCS index.

In a possible implementation of the third aspect, a value range of the first MCS index is determined based on the size of the resource for transmitting the control channel, and the second MCS index is an index of the first MCS index. Because the size of the resource for transmitting the control channel may reflect the value range of the first MCS index, the quantity of bits required by the second MCS index may be less than that required by the first modulation and coding scheme index.

In a possible implementation of the third aspect, the network device determines a reference value of an MCS index based on the size of the resource for transmitting the control channel, and the second MCS index is an offset of the first MCS index on the basis of the reference value of the MCS index. It may be understood that, the offset used to indicate the first MCS index, to be specific, a quantity of bits of the second MCS index, is less than a quantity of bits used to indicate a first MCS index value.

In a possible implementation of the third aspect, the first control information includes a quantity of time units for transmitting the data channel, the second control information includes second indication information, the second indication information is used to indicate an index of the quantity of the time units for transmitting the data channel, and the network device determines an index of a quantity of time units for transmitting the data channel in the second control information based on the size of the resource for transmitting the control channel and the quantity of the time units for transmitting the data channel in the first control information.

In a possible implementation of the third aspect, a reference value of the quantity of the time units for transmitting the data channel is determined based on the size of the resource for transmitting the control channel, and the index of the quantity of the time units for transmitting the data channel in the second control information is an offset of the quantity of the time units for transmitting the data channel on the basis of the reference value.

In a possible implementation of the third aspect, a range of the quantity of the time units for transmitting the data channel is determined based on the size of the resource for transmitting the control channel, and the index of the quantity of the time units for transmitting the data channel in the second control information is an index within the range of the quantity of the time units.

In a possible implementation of the third aspect, the first control information includes a repetition quantity of the data channel, the second control information includes third indication information, the third indication information is used to indicate an index of the repetition quantity of the data channel, and the network device determines an index of a repetition quantity of the data channel in the second control information based on the size of the resource for transmitting the control channel and the repetition quantity of the data channel in the first control information.

In a possible implementation of the third aspect, the network device determines a reference value of the repetition quantity of the data channel based on the size of the resource for transmitting the control channel; and the index of the repetition quantity of the data channel in the second control information is an offset of the repetition quantity of the data channel on the basis of the reference value of the repetition quantity.

In a possible implementation of the third aspect, the network device determines a range of the repetition quantity of the data channel based on the size of the resource for transmitting the control channel, and the index of the repetition quantity of the data channel in the second control information is an index within the range of the repetition quantity.

In a possible implementation of the first aspect, the size of the resource for transmitting the control channel is a quantity of control channel elements used for transmitting the control channel or a quantity of times of retransmission of the control channel. The quantity of times of retransmission of the control channel may be a quantity of times of retransmission in time domain, or may be a quantity of times of retransmission in frequency domain, or may be a quantity of times of retransmission in time domain and in frequency domain.

In a possible implementation of the third aspect, when the quantity of the control channel elements used to transmit the control channel is greater than 1, the control channel elements belong to at least one control resource set.

In a possible implementation of the third aspect, the second control information includes a field used to indicate at least one of the second MCS index, the index of the quantity of time units for transmitting the data channel, or the repetition quantity of the data channel.

According to a fourth aspect, a communication method is provided. The method includes: receiving, by a terminal device, a control channel, detecting the control channel, and determining a size of a resource for transmitting the control channel, where the control channel carries a first parameter, and the first parameter is used to control transmission of data on a data channel; determining, by the terminal device, a quantity of times of retransmission of the data channel based on a first mapping relationship and the size of the resource for transmitting the control channel, where the first mapping relationship is a mapping relationship between the size of the resource for transmitting the control channel and the quantity of times of retransmission of the data channel; and receiving, by the terminal device, the data channel based on the quantity of times of retransmission of the data channel. By using the method, the quantity of times of retransmission of the data channel does not need to be indicated to the terminal device through the control channel. Therefore, the payload size of the control channel is effectively reduced, and transmission efficiency and reliability of the control channel are improved.

In a possible implementation of the fourth aspect, the first mapping relationship is predefined, or the terminal device obtains the first mapping relationship by receiving a radio resource control message from a network device.

In a possible implementation of the fourth aspect, the size of the resource for transmitting the control channel is a quantity of control channel elements used to transmit the control channel, or a quantity of times of retransmission of the control channel, or a product of the quantity of the control channel elements used to transmit the control channel and the quantity of times of retransmission of the control channel.

In a possible implementation of the fourth aspect, when the quantity of the control channel elements used to transmit the control channel is greater than 1, the control channel elements belong to at least one control resource set.

In a possible implementation of the fourth aspect, the quantity of times of retransmission of the control channel is a quantity of times of retransmission of the control channel in time domain, or a quantity of times of retransmission of the control channel in frequency domain.

According to a fifth aspect, a communication method is provided. The method includes: receiving, by a terminal device, a control channel, detecting the control channel, and determining a size of a resource for transmitting the control channel, where the control channel carries a first parameter, and the first parameter is used to control transmission of data on a data channel; determining, by the terminal device based on a second mapping relationship and the size of the resource for transmitting the control channel, a quantity of time units for transmitting the data channel, where the second mapping relationship is a mapping relationship between the size of the resource for transmitting the control channel and the quantity of time units for transmitting the data channel; and receiving, by the terminal device, the data channel based on the quantity of the time units for transmitting the data channel. By using the method, the quantity of the time units for transmitting the data channel does not need to be indicated to the terminal device through the control channel. Therefore, the payload size of the control channel is effectively reduced, and transmission efficiency and reliability of the control channel are improved.

In a possible implementation of the fifth aspect, the second mapping relationship is predefined, or the terminal device obtains the second mapping relationship by receiving a radio resource control message from a network device.

In a possible implementation of the fifth aspect, the size of the resource for transmitting the control channel is a quantity of control channel elements used to transmit the control channel, or a quantity of times of retransmission of the control channel, or a product of the quantity of the control channel elements used to transmit the control channel and the quantity of times of retransmission of the control channel.

In a possible implementation of the fifth aspect, when the quantity of the control channel elements used to transmit the control channel is greater than 1, the control channel elements belong to at least one control resource set.

In a possible implementation of the fifth aspect, the quantity of times of retransmission of the control channel is a quantity of times of retransmission of the control channel in time domain, or a quantity of times of retransmission of the control channel in frequency domain.

According to a sixth aspect, a communications method is provided. The method includes: receiving, by a terminal device, a control channel, detecting the control channel, and determining a size of a resource for transmitting the control channel, where the control channel is used to carry second control information; and obtaining, by the terminal device, the second control information through the control channel, and determining first control information based on the second control information and the size of the resource for transmitting the control channel, where the first control information is used to control transmission of data on a data channel.

Because the size of the resource for transmitting the control channel reflects transmission quality of the data channel to some extent, the size of the resource for transmitting the control channel may further be used to reduce a quantity of bits used to indicate the first control information, that is, reduce a quantity of bits of the second control information in the control channel. In the control information transmission method, the second control information is determined based on the size of the resource for transmitting the control channel and the first control information, so that the quantity of bits of the second control information can be effectively reduced. On a premise that a transmission resource of the control channel is fixed, transmission reliability of the control channel can be improved. On a premise that transmission reliability is fixed, the transmission resource of the control channel can be reduced, and transmission efficiency can be improved.

In a possible implementation of the sixth aspect, the first control information includes a first modulation and coding scheme (MCS) index, the second control information includes first indication information, the first indication information is used to indicate a second MCS index, and the terminal device determines the first MCS index based on the size of the resource and the second MCS index.

In a possible implementation of the sixth aspect, a value range of the first MCS index is determined based on the size of the resource for transmitting the control channel, and the second MCS index is an index of the first MCS index. Because the size of the resource for transmitting the control channel may reflect the value range of the first MCS index, the quantity of bits required by the second MCS index may be less than that required by the first modulation and coding scheme index.

In a possible implementation of the sixth aspect, the network device determines a reference value of an MCS index based on the size of the resource for transmitting the control channel, and the second MCS index is an offset of the first MCS index on the basis of the reference value of the MCS index. It may be understood that, the offset used to indicate the first MCS index, to be specific, a quantity of bits of the second MCS index, is less than a quantity of bits used to indicate a first MCS index value.

In a possible implementation of the sixth aspect, the first control information includes a quantity of time units for transmitting the data channel, the second control information includes second indication information, the second indication information is used to indicate an index of the quantity of the time units for transmitting the data channel, and the terminal device determines the quantity of the time units for transmitting the data channel in the first control information based on the size of the resource for transmitting the control channel and the index of the quantity of the time units for transmitting the data channel in the second control information.

In a possible implementation of the sixth aspect, a reference value of the quantity of the time units for transmitting the data channel is determined based on the size of the resource for transmitting the control channel, and the index of the quantity of the time units for transmitting the data channel in the second control information is an offset of the quantity of the time units for transmitting the data channel on the basis of the reference value of the quantity of the time units.

In a possible implementation of the sixth aspect, a range of the quantity of the time units for transmitting the data channel is determined based on the size of the resource for transmitting the control channel, and the index of the quantity of the time units for transmitting the data channel in the second control information is an index within the range of the quantity of the time units.

In a possible implementation of the sixth aspect, the first control information includes a repetition quantity of the data channel, the second control information includes third indication information, the third indication information is used to indicate an index of the repetition quantity of the data channel, and the terminal device determines the repetition quantity of the data channel in the first control information based on the size of the resource for transmitting the control channel and the index of the repetition quantity of the data channel in the second control information.

In a possible implementation of the sixth aspect, the terminal device determines a reference value of the repetition quantity of the data channel based on the size of the resource for transmitting the control channel, and the index of the repetition quantity of the data channel in the second control information is an offset of the repetition quantity of the data channel on the basis of the reference value.

In a possible implementation of the sixth aspect, the terminal device determines a range of the repetition quantity of the data channel based on the size of the resource for transmitting the control channel, and the index of the repetition quantity of the data channel in the second control information is an index within the range.

In a possible implementation of the sixth aspect, the size of the resource for transmitting the control channel is a quantity of control channel elements used for transmitting the control channel or a quantity of times of retransmission of the control channel.

In a possible implementation of the sixth aspect, when the quantity of the control channel elements used to transmit the control channel is greater than 1, the control channel elements belong to at least one control resource set.

In a possible implementation of the sixth aspect, the second control information includes a field used to indicate at least one of the second MCS index, the index of the quantity of the time units for transmitting the data channel, or the repetition quantity of the data channel.

According to a seventh aspect, a communications apparatus is provided. The apparatus includes a processing unit and a sending unit, to perform the method in any one of the first aspect or the possible implementations of the first aspect, or perform the method in any one of the second aspect or the possible implementations of the second aspect, or perform the method in any one of the third aspect or the possible implementations of the third aspect.

According to an eighth aspect, a communications apparatus is provided. The apparatus includes a processor, a memory, and a transceiver, to perform the method in any one of the first aspect or the possible implementations of the first aspect, or perform the method in any one of the second aspect or the possible implementations of the second aspect, or perform the method in any one of the third aspect or the possible implementations of the third aspect.

According to a ninth aspect, a communications apparatus is provided. The apparatus includes a processing unit and a receiving unit, to perform the method in any one of the fourth aspect or the possible implementations of the fourth aspect, or perform the method in any one of the fifth aspect or the possible implementations of the fifth aspect, or perform the method in any one of the sixth aspect or the possible implementations of the sixth aspect.

According to a tenth aspect, a communications apparatus is provided. The apparatus includes a processor, a memory, and a transceiver, to perform the method in any one of the fourth aspect or the possible implementations of the fourth aspect, or perform the method in any one of the fifth aspect or the possible implementations of the fifth aspect, or perform the method in any one of the sixth aspect or the possible implementations of the sixth aspect.

According to an eleventh aspect, a computer readable storage medium is provided, where the computer readable storage medium stores an instruction, and when the instruction is run on a computer, the computer is enabled to perform the method in any one of the first aspect or the possible implementations of the first aspect, or perform the method in any one of the second aspect or the possible implementations of the second aspect, or perform the method in any one of the third aspect or the possible implementations of the third aspect.

According to a twelfth aspect, a computer readable storage medium is provided, where the computer readable storage medium stores an instruction, and when the instruction is run on a computer, the computer is enabled to perform the method in any one of the fourth aspect or the possible implementations of the fourth aspect, or perform the method in any one of the fifth aspect or the possible implementations of the fifth aspect, or perform the method in any one of the sixth aspect or the possible implementations of the sixth aspect.

According to a thirteenth aspect, a computer program product including an instruction is provided, where when the computer program product is run on a computer, the computer is enabled to perform the method in any one of the first aspect or the possible implementations of the first aspect, or perform the method in any one of the second aspect or the possible implementations of the second aspect, or perform the method in any one of the third aspect or the possible implementations of the third aspect.

According to a fourteenth aspect, a computer program product including an instruction is provided, where when the computer program product is run on a computer, the computer is enabled to perform the method in any one of the fourth aspect or the possible implementations of the fourth aspect, or perform the method in any one of the fifth aspect or the possible implementations of the fifth aspect, or perform the method in any one of the sixth aspect or the possible implementations of the sixth aspect.

According to a fifteenth aspect, a chip product for a network device is provided, to perform the method in any one of the first aspect or the possible implementations of the first aspect, or perform the method in any one of the second aspect or the possible implementations of the second aspect, or perform the method in any one of the third aspect or the possible implementations of the third aspect.

According to a sixteenth aspect, a chip product for a terminal device is provided, to perform the method in any one of the fourth aspect or the possible implementations of the fourth aspect, or perform the method in any one of the fifth aspect or the possible implementations of the fifth aspect, or perform the method in any one of the sixth aspect or the possible implementations of the sixth aspect.

DETAILED DESCRIPTION OF ILLUSTRATIVE EMBODIMENTS

Figure 1:
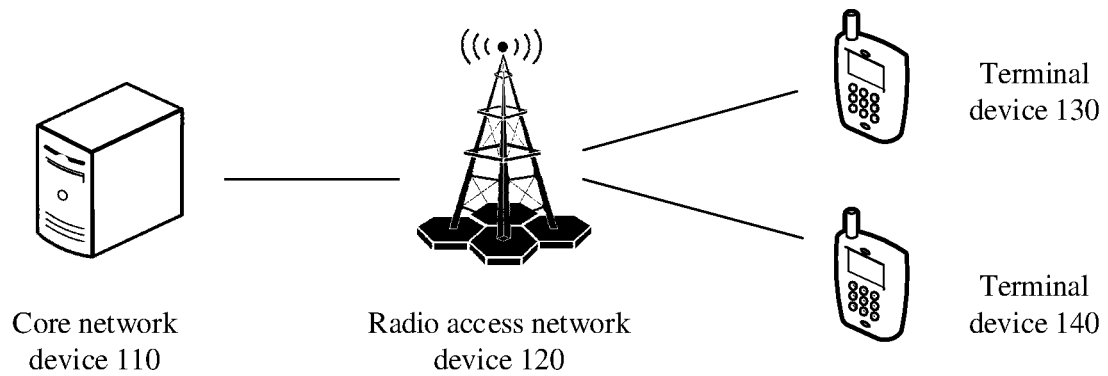
FIG. 1 is a schematic architectural diagram of a mobile communications system to which an embodiment of this application is applied.

FIG. 1 is a schematic architectural diagram of a mobile communications system to which an embodiment of this application is applied. As shown in FIG. 1, the mobile communications system includes a core network device 110, a radio access network device 120, and at least one terminal device (for example, a terminal device 130 and a terminal device 140 in FIG. 1). The terminal device is connected to the radio access network device in a wireless manner, and the radio access network device is connected to the core network device in a wireless or wired manner. The core network device and the radio access network device may be different physical devices that are independent of each other, or a function of the core network device and a logical function of the radio access network device may be integrated into a same physical device, or some functions of the core network device and some functions of the radio access network device may be integrated into one physical device. The terminal device may be at a fixed location or may be mobile. FIG. 1 is merely a schematic diagram. The communications system may further include another network device, for example, may further include a wireless relay device and a wireless backhaul device, which are not drawn in FIG. 1. Quantities of core network devices, radio access network devices, and terminal devices, which are included in the mobile communications system, are not limited in this embodiment of this application.

The radio access network device is an access device used by the terminal device to access the mobile communications system in a wireless manner, and may be a base station NodeB, an evolved based station eNodeB, a base station in a 5G mobile communications system or a new radio (NR) communications system, a base station in a future mobile communications system, an access node in a Wi-Fi system, or the like. A specific technology and a specific device form used by the radio access network device are not limited in this embodiment of this application. In this application, the radio access network device is briefly referred to as a network device. Unless otherwise specified, in this application, all network devices are radio access network devices. In this application, 5G and NR may be equivalent.

The terminal device may also be referred to as a terminal, user equipment (UE), a mobile station (MS), a mobile terminal (MT), or the like. The terminal device may be a mobile phone, a tablet computer (Pad), a computer having a wireless sending/receiving function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

The radio access network device and the terminal device may be deployed on land, including indoors or outdoors, being handheld or in-vehicle; or may be deployed on water surface; or may be deployed in an airplane, a balloon, or a satellite in the air. Application scenarios of the radio access network device and the terminal device are not limited in this embodiment of this application.

This embodiment of this application may be applied to downlink signal transmission, or may be applied to uplink signal transmission, or may be applied to device-to-device (D2D) signal transmission. For the downlink signal transmission, a sending device is the radio access network device, and a corresponding receiving device is the terminal device. For the uplink signal transmission, a sending device is the terminal device, and a corresponding receiving device is the radio access network device. For the D2D signal transmission, a sending device is a terminal device, and a corresponding receiving device is also a terminal device. A signal transmission direction is not limited in this embodiment of this application.

Communication between the radio access network device and the terminal device and communication between the terminal devices may be performed by using a licensed spectrum, or may be performed by using an unlicensed spectrum, or may be performed by using both a licensed spectrum and an unlicensed spectrum. Communication between the radio access network device and the terminal device and communication between the terminal devices may be performed by using a spectrum below 6 G, or may be performed by using a spectrum above 6 G, or may be performed by using both a spectrum below 6 G and a spectrum above 6 G. A spectrum resource used between the radio access network device and the terminal device is not limited in this embodiment of this application.

Downlink transmission between a sending device that is the network device and a receiving device that is the terminal device is used as an example below for description. However, the method in this application may also be applied to uplink transmission between a sending device that is the terminal device and a receiving device that is the network device, and applied to D2D transmission between a sending device that is a terminal device and a receiving device that is also a terminal device.

For ease of understanding of this application, the following first describes some basic concepts in this application.

(1) Control Channel and Data Channel

The network device may send data to the terminal device through the data channel. To enable the terminal device to correctly receive the data on the data channel, the network device and the terminal device need to agree on some transmission parameters for transmitting the data on the data channel. For example, the parameters may include information such as a modulation and coding scheme (MCS), a transport block size (TBS), a redundancy version (redundancy version, RV), a hybrid automatic repeat request (HARQ) process number, resource block assignment (RA), precoding information (PCI), or a precoding indicator (PCI). The transmission parameters may be predefined in a protocol, or may be sent by the network device to the terminal device by using signaling. In this application, unless otherwise specified, the signaling may include at least one of radio resource control (RRC) signaling, medium access control (MAC) layer signaling, and physical layer signaling.

The transmission parameters are used to control transmission of data on a data channel. After obtaining the transmission parameters, the terminal device may receive data on the data channel, and demodulate and decode the received data. For example, for downlink data transmission, the data channel may be a physical downlink shared channel (PDSCH), and a control parameter for controlling transmission of data on the PDSCH is transmitted through a physical downlink control channel (PDCCH). For uplink data transmission, the data channel may be a physical uplink shared channel (PUSCH), and a control parameter for controlling transmission of data on the PUSCH is transmitted from the network device to the terminal device through the PDCCH.

In this application, description is made by using an example in which the control channel is a PDCCH and the data channel is a PDSCH. The control channel may be equivalent to the PDCCH in description. However, specific names of the control channel and the data channel are not limited in this application.

(2) PDCCH Carries Downlink Control Information (DCI)

The PDCCH carries scheduling assignment information and other control information, and the information carried on the PDCCH may be collectively referred to as DCI. The foregoing transmission parameters may be part of the DCI. Payloads sizes of DCI in different scenarios may be different. Consequently, DCI formats may be different, and further sizes of resources used for transmitting the PDCCH may be different. For example, a payload size of DCI for scheduling uplink data transmission may be different from that of DCI for scheduling downlink data transmission, and a payload size of DCI for scheduling single-flow downlink data transmission may also be different from that of DCI for scheduling multi-flow downlink data transmission.

(3) Aggregation Level (AL) of the PDCCH

The aggregation level refers to a quantity of control channel elements (CCES) used for carrying one PDCCH. The CCE is a basic unit of a physical resource of the control channel. One CCE includes a plurality of resource element groups (REGS): in a long term evolution (LTE) communications system, one CCE includes nine REGs; and in an NR system, one CCE includes six REGs. One REG includes a plurality of resource elements (RE): in the LTE system, one REG includes four REs; and in the NR system, one REG includes one resource block (RB) in one OFDM symbol. An RE includes one subcarrier in one OFDM symbol, and is a smallest physical time-frequency resource in the LTE system and the NR system. In this application, unless otherwise specified, a symbol and a time-domain symbol are equivalent to each other and interchangeable. The OFDM symbol is an example of the time-domain symbol, but the time-domain symbol is not limited to the OFDM symbol.

In the LTE system, common aggregation levels are 1, 2, 4, and 8. In the NR system, aggregation levels 16 and 32 may further be used.

A network side determines the aggregation level of the PDCCH based on factors such as the payload size of the DCI and quality of the radio channel. A larger payload of the DCI indicates a higher corresponding aggregation level of the PDCCH. When the quality of the radio channel is worse, a higher aggregation level of the PDCCH is required to ensure PDCCH transmission quality.

Using the LTE system as an example, a possible format of the PDCCH is shown in Table 1.

TABLE 1

| PDCCH Format | Quantity of CCEs | Quantity of REGs | Quantity of information bits in a PDCCH |
| --- | --- | --- | --- |
| 0 | 1 | 9 | 72 |
| 1 | 2 | 18 | 144 |
| 2 | 4 | 36 | 288 |
| 3 | 8 | 72 | 576 |

(4) Search Space (Search Space) of the Control Channel

For the terminal device, a quantity of CCEs of each PDCCH changes and is not notified by using signaling. Therefore, the terminal device has to perform blind detection on PDCCH candidates at all possible aggregation levels. To reduce a quantity of times of blind detection and reduce complexity of blind detection for the terminal, a system may predefine an aggregation level set. For example, an aggregation level set {1, 2, 4, 8} may be defined. To be specific, the network device may send PDCCHs by using 1, 2, 4, or 8 CCEs. Correspondingly, the terminal device needs to separately perform blind detection on the PDCCHs of aggregation levels 1, 2, 4, and 8, to determine whether there is a PDCCH sent to the terminal device.

To further reduce the quantity of times of blind detection and reduce the complexity of blind detection for the terminal, the system defines a series of possible PDCCH locations in a control resource area for each aggregation level, and the locations are referred to as PDCCH candidates. A set of PDCCH candidates that need to be monitored by the terminal is referred to as a search space. A set of PDCCH candidates that corresponds to an aggregation level is referred to as a search space at the aggregation level.

(5) Control Resource Set (CORESET)

Figure 2:
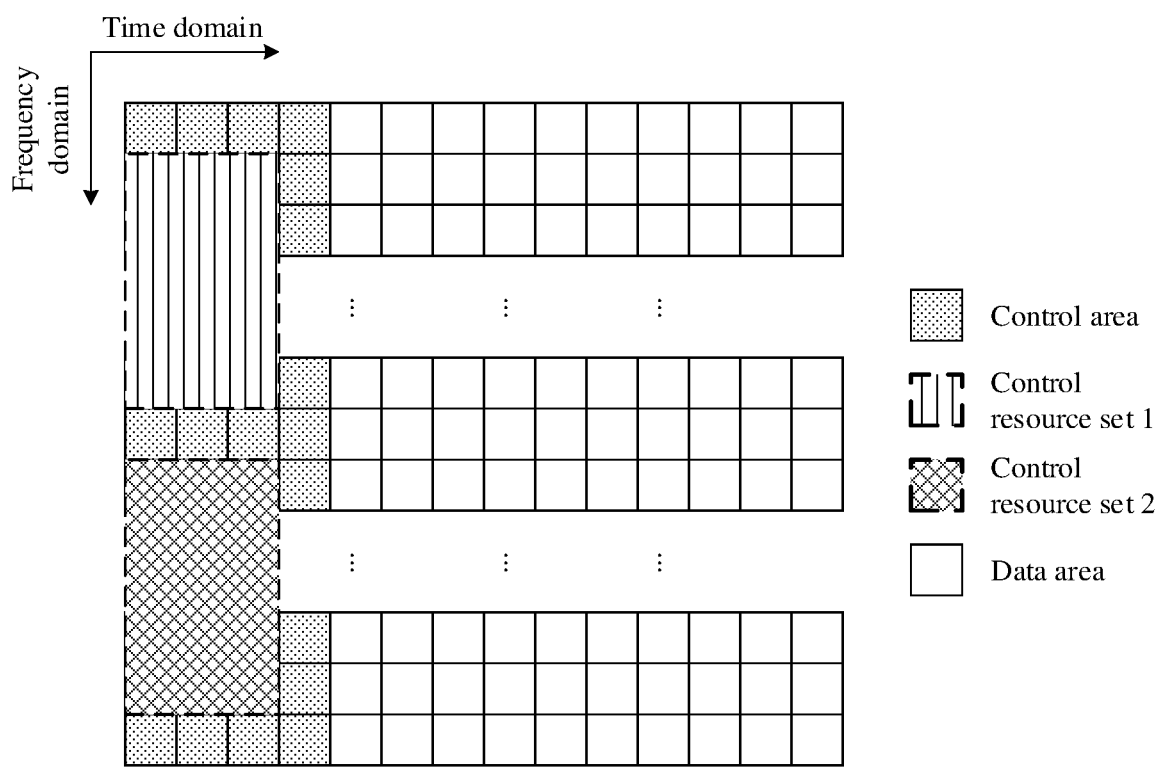
FIG. 2 is a schematic diagram of a control resource set according to an embodiment of this application.

FIG. 2 shows an example of a control resource set (CORESET) in this application. As shown in FIG. 2, a CORESET is a time-frequency resource block in a control area. One CORESET corresponds to a group of user equipment (UE). For example, a CORESET 1 corresponds to a UE 1, a UE 2, a UE 3, and a UE 4, and a CORESET 2 corresponds to a UE 4, a UE 5, a UE 6, and a UE 7. PDCCHs of the UE 1, the UE 2, the UE 3, and the UE 4 may be transmitted on the CORESET 1, and PDCCHs of the UE 4, the UE 5, the UE 6, and the UE 7 may be transmitted on the CORESET 2. Each user has a search space on a CORESET, and a size of a resource of the search space is less than or equal to a size of a resource of the CORESET. One user may correspond to a plurality of CORESETs, and numerologies on the CORESETs may be the same or different. The numerology herein includes a subcarrier spacing and a cyclic prefix (CP) length.

Figure 3:
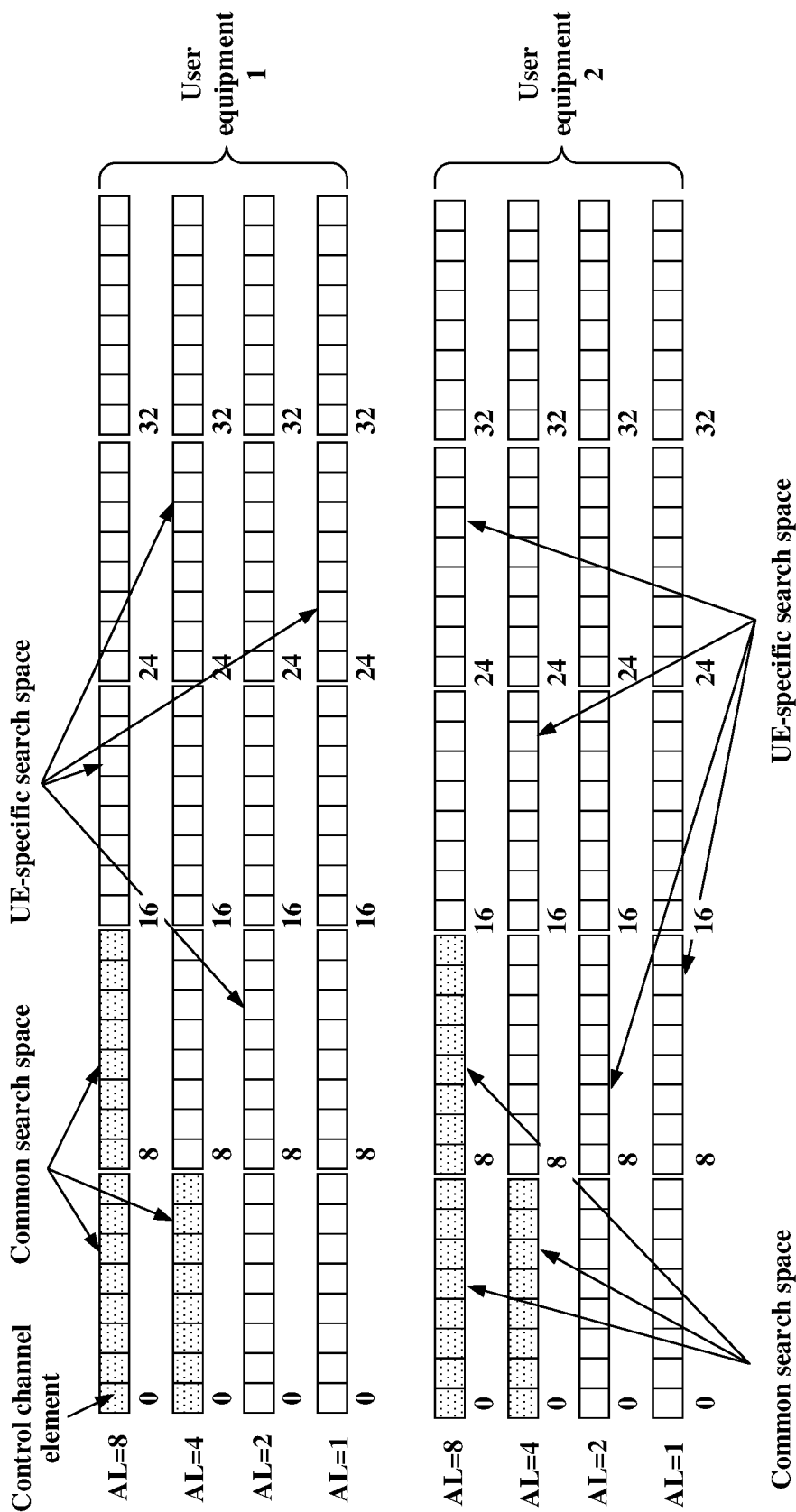
FIG. 3 is a schematic diagram of a logical mapping relationship between a search space and a PDCCH candidate according to an embodiment of this application.

FIG. 3 shows an example of a logical mapping relationship between search spaces and PDCCH candidates. As shown in FIG. 3, one UE has search spaces at a plurality of different aggregation levels. A UE 1 in FIG. 3 is used as an example. The UE 1 has search spaces at four different aggregation levels, a search space whose aggregation level is 8 (AL=8) includes two PDCCH candidates whose aggregation levels are 8 (AL=8), a search space whose aggregation level is 4 (AL=4) includes two PDCCH candidates whose aggregation levels are 4 (AL=4); a search space whose aggregation level is 2 (AL=2) includes six PDCCH candidates whose aggregation levels are 2 (AL=2); and a search space whose aggregation level is 1 (AL=1) includes six PDCCH candidates whose aggregation levels are 1 (AL=1). The U 2 in FIG. 3 also has search spaces at four different aggregation levels. For a same aggregation level, search spaces of the UE 2 and the search spaces of the UE 1 may have an overlapping part, such as an aggregation level 8 and an aggregation level 2. Alternatively, the search spaces of the UE 2 and the search spaces of the UE 1 may not have an overlapping part, for example, an aggregation level 4 and an aggregation level 1.

FIG. 3 further shows an example of a logical mapping relationship between PDCCH candidates and CCEs. The system uniformly numbers CCEs in the control area. A number of a CCE is a logical number and is used to uniquely determine a physical resource location of the CCE. That numbers of CCEs forming a PDCCH candidate are consecutive does not represent that the CCEs forming the PDCCH candidate are consecutive on a physical resource.

Figure 4:
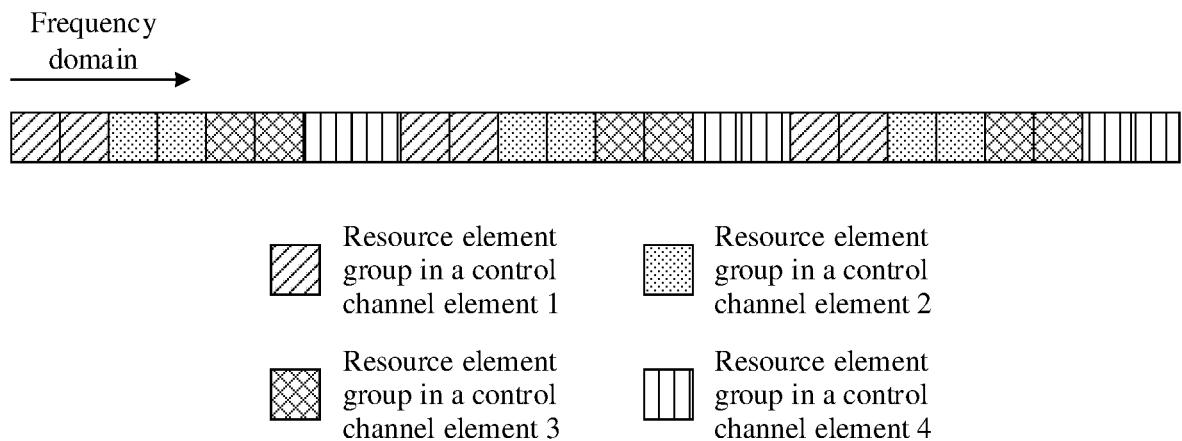
FIG. 4 is a schematic diagram of discrete resource mapping of a CCE according to an embodiment of this application.
Figure 5:
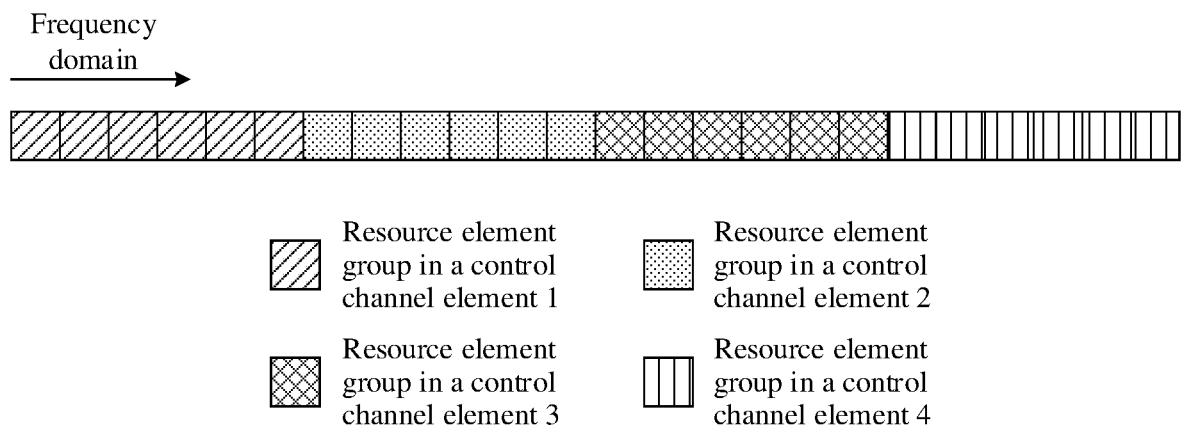
FIG. 5 is a schematic diagram of localized resource mapping of a CCE according to an embodiment of this application.

FIG. 4 and FIG. 5 separately show that REGs that are discrete in frequency domain are mapped to a same CCE and REGs that are consecutive in frequency domain are mapped to a same CCE.

As shown in FIG. 4, a CCE 1, a CCE 2, a CCE 3, and a CCE 4 each include six REGs that are discrete in frequency domain. The resource mapping manner in which one CCE includes a plurality of discrete REGs is referred to as discrete resource mapping or distributed resource mapping. For distributed resource mapping, physical resources carrying one PDCCH are relatively dispersed in frequency domain, so that robustness and transmission efficiency of PDCCH transmission can be improved by using a frequency diversity gain.

As shown in FIG. 5, the CCE 1, the CCE 2, the CCE 3, and the CCE 4 each include six REGs that are consecutive in frequency domain, and the resource mapping manner in which one CCE includes a plurality of consecutive REGs is referred to as localized resource mapping. For localized resource mapping, physical resources carrying one PDCCH are relatively centralized in frequency domain. The network device selects, through scheduling, a frequency resource with relatively good channel quality to carry the PDCCH, so that transmission efficiency and transmission reliability of the PDCCH can be improved by using frequency selectivity of a radio channel.

In this application, a time unit may be one of a time domain symbol, a mini-slot (mini-slot), a slot, a subframe, or a frame.

It should be noted that, for resource concepts such as the REG, the CCE, the PDCCH candidate, and the search space in this application, refer to existing definitions (for example, definitions provided in an LTE standard and an NR communications system), but the resource concepts are not limited to the existing definitions. Definitions of these resource concepts in a future communications standard may be different, and this does not affect implementation of this application.

(6) MCS/TBS Indication in the LTE System

In the LTE system, the network device notifies the terminal device of a modulation order and TBS information by using an MCS index value in an MCS field in the DCI. An MCS field in a DCI format 0 may be used to indicate a modulation order and a TBS in a PUSCH, and an MCS field in a DCI format 1A may be used to indicate a modulation order and a TBS in a PDSCH.

Table 2 shows a possible relationship between an MCS index value and a modulation order and a TBS in the LTE system. As shown in Table 2, when a value of the modulation order is 2, it indicates that a modulation scheme is quadrature phase shift keying (QPSK); when the value of the modulation order is 4, it indicates that the modulation scheme is 16 quadrature amplitude modulation (QAM); and when the value of the modulation order is 6, it indicates that the modulation scheme is 64 QAM. The transport block size may be determined by combining a TBS index with an allocated resource size.

TABLE 2

| MCS index $I_{MCS}$ | Modulation order $Q_m$ | TBS index $I_{TBS}$ |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | Reserved |
| 30 | 4 | |
| 31 | 6 | |

The MCS field herein may be used to indicate the PDSCH channel or may be used to indicate the PUSCH channel.

(7) Indication of a Repetition Quantity in the LTE System

The network device indicates a repetition quantity of the PDSCH or the PUSCH by using a repetition quantity field. For example, a possible indication method is that repetition quantities 1, 4, 8, 16, 32, 64, 128, and 192 are indicated by using a repetition quantity field with a length of 3 bits. In this application, a repetition quantity of the data channel or the control channel may also be understood as a quantity of times of retransmission of the data channel or the control channel.

The foregoing indication method used to indicate an MCS/TBS and a repetition quantity has some information redundancy, which increases transmission overheads of the PDCCH and reduces, when a transmission resource is fixed, transmission reliability of the PDCCH.

For a URLLC service, a transmission reliability requirement of the PDCCH and a transmission reliability requirement of the PDSCH are the same. A transmission bit rate of the PDCCH reflects a bit rate required by PDSCH transmission to some extent. The bit rate herein refers to a bit rate obtained by dividing a quantity of information bits before channel coding by a quantity of bits capable of being carried by a physical resource. Generally, the modulation scheme of the PDCCH is fixed to QPSK, and on the premise that the PDCCH format is determined, a bit rate of the PDCCH is determined by a quantity of CCEs for transmitting the PDCCH. A bit rate of the PDSCH is determined by a TBS, a modulation scheme, and a repetition quantity. Therefore, the quantity of the CCEs for transmitting the PDCCH may also reflect the TBS, the modulation scheme, and the repetition quantity of the PDSCH to some extent, so that the quantity of bits used to indicate the TBS, the modulation scheme, and the repetition quantity may be reduced by using aggregation level information of the PDCCH. When a transmission resource of the PDCCH is fixed, transmission reliability of the PDCCH can be improved. On a premise that transmission reliability is fixed, the transmission resource of the PDCCH can be reduced, and transmission efficiency can be improved.

Figure 6:
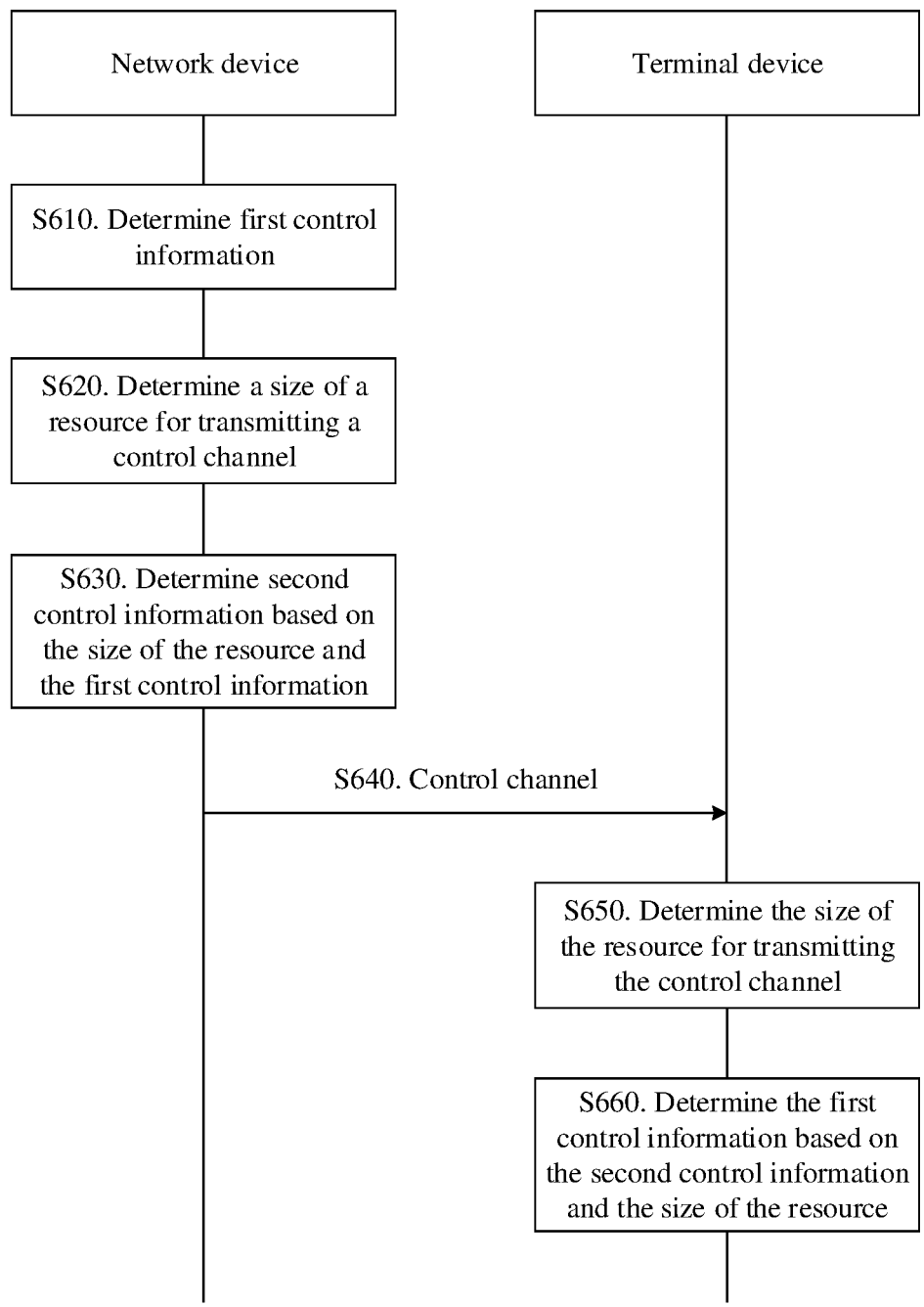
FIG. 6 is a schematic diagram of a control information transmission method according to an embodiment of this application.

As shown in FIG. 6, this application provides a control information transmission method. In the method, a payload size of a PDCCH is reduced by using aggregation level information of the PDCCH, so that transmission reliability of the PDCCH can be effectively improved on a premise that a transmission resource is fixed.

S610. A network device determines first control information, where the first control information is used to control transmission of data on a data channel.

The network device may schedule to-be-transmitted data at an interval, for example, at an interval of 1 millisecond (ms) or 0.1 ms, to determine a scheduling result: a terminal device to which a resource is allocated, a size of a data block that is transmitted, a modulation scheme for transmission, a HARQ process used for transmission, a rate matching parameter used, duration of data transmission, and a quantity of times of retransmission of data.

Downlink data transmission is used as an example below. The first control information includes transmission parameters used to control transmission of data on a PDSCH. After obtaining the transmission parameters, a terminal device may receive the data on the PDSCH, and demodulate and decode the received data. For uplink data transmission, the first control information includes transmission parameters used to control transmission of data on the PUSCH. After obtaining the parameters, the terminal device may transmit data through the PUSCH, and the network device may receive the data on the PUSCH based on the parameters, and demodulate and decode the received data.

The first control information may include at least one of a first MCS index, a quantity of time units for transmitting the data channel, a repetition quantity of the data channel, a modulation order, a transport block size, and a bit rate of the data channel. The first MCS index may be used to indicate a modulation order of the PDSCH and a TBS transmitted on the PDSCH. For a specific indication manner, refer to Table 2. Herein, the repetition quantity of the data channel may be a repetition quantity in frequency domain or a repetition quantity in time domain, or may be a sum of the repetition quantity in time domain and the repetition quantity in frequency domain.

S620. The network device determines a size of a resource for transmitting a control channel, where the control channel is used to carry second control information.

Specifically, the control channel may be the PDCCH, and the size of the resource for transmitting the control channel may be a quantity of CCEs for transmitting the PDCCH. For PDCCH transmission, the network device needs to determine the quantity of the CCEs used to transmit the PDCCH. In a scenario in which the PDCCH is transmitted by using a control resource on a CORESET, the resource size herein may further be understood as an aggregation level, that is, the quantity of the CCEs for transmitting the PDCCH. When a PDCCH is transmitted by using control resources on two or more CORESETs, the size of the resource for transmitting the control channel may be understood as a sum of aggregation levels on all the CORESETs, that is, a total quantity of the CCEs for transmitting the PDCCH.

The size of the resource for transmitting the control channel may alternatively be a quantity of times of retransmission of the control channel; or may be a value obtained after mathematical processing is performed on the quantity of the CCEs for transmitting the control channel and the quantity of times of retransmission of the control channel. For example, the size of the resource for transmitting the control channel is equal to a product of the quantity of the CCEs for transmitting the control channel and the quantity of times of retransmission of the control channel; when the quantity of the CCEs for transmitting the control channel is 4 and the quantity of times of retransmission of the control channel is 2, the size of the resource for transmitting the control channel is 8. The quantity of times of retransmission of the control channel may be a quantity of times of retransmission in time domain, or may be a quantity of times of retransmission in frequency domain, or may be a quantity of times of retransmission in time domain and in frequency domain.

The network device may determine, based on at least one factor of a payload size of the control channel and radio channel quality, the size of the resource for transmitting the control channel.

In this application, description is made by using an example in which the size of the resource for transmitting the control channel is equal to the quantity of the CCEs for transmitting the PDCCH.

S630. The network device determines second control information based on the size of the resource for transmitting the control channel and the first control information.

As described in the foregoing, the quantity of the CCEs for transmitting the PDCCH may also reflect the TBS, the modulation scheme, and the repetition quantity of the PDSCH to some extent, so that the quantity of bits used to indicate the TBS, the modulation scheme, and the repetition quantity may be reduced by using aggregation level information of the PDCCH.

As shown in Table 2, the MCS index in the first control information indicates a modulation order and a TBS by using five bits. Considering that the quantity of the CCEs for transmitting the PDCCH also reflects a channel quality range, the modulation order and the TBS range of the PDSCH may also be indirectly reflected. On a premise that a quantity of bits before coding of the PDCCH is determined, a larger quantity of the CCEs for transmitting the PDCCH indicates worse channel quality, a smaller TBS capable of being transmitted through the PDSCH, a lower modulation order capable of being used, a larger quantity of required transmission time units, and a larger repetition quantity required by the PDSCH at this time. Therefore, information about the quantity of the CCEs for transmitting the PDCCH is used, so that fewer bits may be used to indicate the modulation order and the TBS of the PDSCH.

Specifically, the PDCCH carries second control information, the second control information may include first indication information, and the first indication information is used to indicate a second MCS index. The first indication information may directly indicate the second MCS index by using a first field, and the first field is used to indicate only the second MCS index. Alternatively, the first indication information may indicate the second MCS index by using a second field, and the second field is obtained by jointly coding the second MCS index and other information. A specific method for how to indicate the second MCS index is not limited in this application. The second MCS index is determined based on the quantity of the CCEs for transmitting the PDCCH and the first MCS index. There are at least two methods for determining the second MCS index based on the quantity of the CCEs for transmitting the PDCCH and the first MCS index:

In a first manner, a reference value of an MCS index is determined based on the quantity of the CCEs for transmitting the PDCCH, where the second MCS index is an offset of the first MCS index on the basis of the reference value of the MCS index. As shown in Table 3, when the quantity of the CCEs for transmitting the PDCCH is equal to 4, the reference value of the MCS index is 15. In this case, if a value of the second MCS index is 2, a corresponding value of the first MCS index is 17. The terminal device may determine the modulation order and the TBS of the PDSCH based on the first MCS index value. In specific implementation, determining of the reference value of the MCS index is related to the payload size of the DCI in the PDCCH. When the PDCCHs of different payload sizes are transmitted by using a same quantity of CCEs, different reference values of the MCS index may be set. For example, when four CCEs are used to transmit a PDCCH of 200 bits, a reference value of the MCS index may be set to 15. When four CCEs are used to transmit a PDCCH of 400 bits, the reference value of the MCS index may be set to 20. If transmission quality of 400 bits transmitted by using four CCEs is the same as transmission quality of 200 bits transmitted by using four CCEs, it indicates that channel quality in a scenario in which 400 bits are transmitted by using four CCEs is better than channel quality in a scenario in which 200 bits are transmitted by using four CCEs; therefore, a greater reference value of the MCS index may be set in the scenario in which 400 bits are transmitted by using four CCEs. Reference values of the MCS index corresponding to different quantities of CCEs may be predefined in a protocol, or may be notified by the network device to a terminal device by using signaling. It may be understood that Table 3 is merely an example of a mapping relationship between the size of the resource for transmitting the control channel and the MCS index and is not intended to limit this embodiment of this application.

TABLE 3

| Size of a resource for transmitting a control channel | Reference value of an MCS index |
| --- | --- |
| 1 | 25 |
| 2 | 20 |
| 4 | 15 |
| 8 | 10 |
| 16 | 5 |
| 32 | 0 |

In a second manner, a range of the value of the first MCS index is determined based on the quantity of the CCEs for transmitting the PDCCH, where the second MCS index is an index of the first MCS index. Because the quantity of the CCEs may reflect the value range of the first MCS index, a quantity of bits required by the second MCS index is less than that required by the first MCS index. Table 4 shows a method for re-numbering the first MCS index to obtain the second MCS index. A correspondence between the second MCS index and the first MCS index may be predefined in a protocol, or may be notified by the network device to the terminal device by using signaling. It may be understood that Table 4 is merely an example of a mapping relationship among the size of the resource for transmitting the control channel, the first MCS index, and the second MCS index and is not intended to limit this embodiment of this application. In this application, in specific implementation, the mapping relationship may be in a form of a table, or may be implemented by using a branch selection statement or a determining statement such as "if else" or "switch case" in a similar programming language that is a C language. When the mapping relationship is implemented in a form of a table, a sequence of columns in the table is not limited in this application. As shown in Table 4, a first column is the size of the resource for transmitting the control channel, a second column is the first MCS index, and a third column is the second MCS index. During actual implementation, the first column may be the size of the resource for transmitting the control channel, the second column may be the second MCS index, and the third column may be the first MCS index.

TABLE 4

| Size of a resource for transmitting a control channel | First MCS index | Second MCS index |
| --- | --- | --- |
| 1 | 25 | 0 |
|   | 26 | 1 |
|   | 27 | 2 |
|   | 28 | 3 |
| 2 | 20 | 0 |
|   | 21 | 1 |
|   | 22 | 2 |
|   | 23 | 3 |
|   | 24 | 4 |
|   | 25 | 5 |
| 4 | 15 | 0 |
|   | 16 | 1 |
|   | 17 | 2 |
|   | 18 | 3 |
|   | 19 | 4 |
|   | 20 | 5 |
|   | 21 | 6 |

In the foregoing process of mapping the first MCS index to the second MCS index, a quantity of bits used to indicate an MCS index in the PDCCH can be effectively reduced, for example, reduced from 5 bits to 3 bits or even 2 bits.

The second control information may include second indication information, and the second indication information is used to indicate an index of the quantity of the time units for transmitting the data channel. The second indication information may directly indicate, by using a third field, the index of the quantity of the time units for transmitting the data channel, where the third field is used to indicate only the index of the quantity of the time units for transmitting the data channel. The second indication information may further indicate, by using a fourth field, the index of the quantity of the time units for transmitting the data channel, where the fourth field is obtained by jointly coding the index of the quantity of the time units for transmitting the data channel and other information. A specific method for indicating the index of the quantity of the time units for transmitting the data channel is not limited in this application. The network device determines, based on the quantity of the CCEs for transmitting the PDCCH and the quantity of the time units for transmitting the data channel in the first control information, the index of the quantity of the time units for transmitting the data channel in the second control information. Similar to the foregoing method for determining the second MCS index, there are at least two specific methods for determining index information of the quantity of the time units for transmitting the data channel in the second control information:

In a first method, a reference value of the quantity of the time units for transmitting the data channel is determined based on the quantity of the CCEs for transmitting the PDCCH, where the index of the quantity of the time units for transmitting the data channel in the second control information is an offset of the quantity of the time units for transmitting the data channel on the basis of the reference value of the quantity of the time units. As shown in Table 5, when the quantity of the CCEs for transmitting the PDCCH is equal to 4, the reference value of the quantity of the time units for transmitting the data channel is 4. In this case, if the quantity of the time units for transmitting the data channel in the first control information is 6, the index of the quantity of the time units for transmitting the data channel in the corresponding second control information is 2. It may be understood that Table 5 is merely an example of a mapping relationship between the size of the resource for transmitting the control channel and the reference value of the quantity of the time units for transmitting the data channel, and this is not intended to limit this embodiment of this application.

TABLE 5

| Size of a resource for transmitting a control channel | Reference value of a quantity of time units for transmitting a data channel |
| --- | --- |
| 1 | 1 |
| 2 | 2 |
| 4 | 4 |
| 8 | 8 |
| 16 | 16 |
| 32 | 32 |

In a second method, a range of the quantity of the time units for transmitting the data channel is determined based on the quantity of the CCEs for transmitting the PDCCH, where the index of the quantity of the time units for transmitting the data channel in the second control information is an index within the range. Table 6 shows a method for obtaining the index of the quantity of the time units for transmitting the data channel. A correspondence between the quantity of the time units for transmitting the data channel and the index may be predefined in a protocol, or may be notified by the network device to the terminal device by using signaling. It may be understood that Table 6 is merely an example of a mapping relationship among the size of the resource for transmitting the control channel, the quantity of the time units for transmitting the data channel, and the index of the quantity of the time units for transmitting the data channel, and this is not intended to limit this embodiment of this application.

TABLE 6

| Size of a resource for transmitting a control channel | Quantity of time units for transmitting a data channel | Index of the quantity of the time units for transmitting the data channel |
| --- | --- | --- |
| 1 | 1 | 0 |
|   | 2 | 1 |
|   | 3 | 2 |
|   | 4 | 3 |
| 2 | 2 | 0 |
|   | 3 | 1 |
|   | 4 | 2 |
|   | 5 | 3 |
| 4 | 4 | 0 |
|   | 5 | 1 |
|   | 6 | 2 |
|   | 7 | 3 |

In the process of mapping the quantity of the time units for transmitting the data channel to the index of the quantity of the time units for transmitting the data channel, a quantity of bits used to indicate the quantity of the time units for transmitting the data channel in the PDCCH can be effectively reduced, for example, reduced from 3 bits to 2 bits.

The second control information may include third indication information, and the third indication information is used to indicate an index of the repetition quantity of the data channel. The third indication information may directly indicate the index of the repetition quantity of the data channel by using a fifth field, and the fifth field is used to indicate only the index of the repetition quantity of the data channel. The third indication information may alternatively indicate the index of the repetition quantity of the data channel by using a sixth field, and the sixth field is obtained by jointly coding the index of the repetition quantity of the data channel and other information. A specific method for indicating the index of the repetition quantity of the data channel is not limited in this application. The network device determines index information of the repetition quantity of the data channel in the second control information based on the quantity of the CCEs for transmitting the PDCCH and the repetition quantity of the data channel in the first control information. Similar to the foregoing methods for determining the second MCS index, there are at least two specific methods for determining the index information of the repetition quantity of the data channel in the second control information:

In a first method, a reference value of the repetition quantity of the data channel is determined based on the quantity of the CCEs for transmitting the PDCCH, where the index of the repetition quantity of the data channel in the second control information is an offset of the repetition quantity of the data channel on the basis of the reference value. As shown in Table 7, when the quantity of the CCEs for transmitting the PDCCH is equal to 4, the reference value of the repetition quantity of the data channel is 4. In this case, if the repetition quantity of the data channel in the first control information is 6, an index of the repetition quantity of the data channel in the corresponding second control information is 2. It may be understood that Table 7 is merely an example of a mapping relationship between the size of the resource for transmitting the control channel and the reference value of the repetition quantity of the data channel, and is not intended to limit this embodiment of this application.

TABLE 7

| Size of a resource for transmitting a control channel | Reference value of a repetition quantity of a data channel |
| --- | --- |
| 1 | 1 |
| 2 | 2 |
| 4 | 4 |
| 8 | 8 |
| 16 | 16 |
| 32 | 32 |

In a second method, a range of the repetition quantity of the data channel is determined based on the quantity of the CCEs for transmitting the PDCCH, where the index of the repetition quantity of the data channel in the second control information is an index within the range. Table 8 shows a method for obtaining the index of the repetition quantity of the data channel. A correspondence between the repetition quantity of the data channel and the index may be predefined in a protocol, or may be notified by the network device to the terminal device by using signaling. It may be understood that Table 8 is merely an example of a mapping relationship among the size of the resource for transmitting the control channel, the repetition quantity of the data channel, and the index of the repetition quantity of the data channel, and is not intended to limit this embodiment of this application.

TABLE 8

| Size of a resource for transmitting a control channel | Repetition quantity of a data channel | Index of the repetition quantity of the data channel |
| --- | --- | --- |
| 1 | 1 | 0 |
|   | 2 | 1 |
|   | 3 | 2 |
|   | 4 | 3 |
| 2 | 2 | 0 |
|   | 3 | 1 |
|   | 4 | 2 |
|   | 5 | 3 |
| 4 | 4 | 0 |
|   | 5 | 1 |
|   | 6 | 2 |
|   | 7 | 3 |

In the foregoing process of mapping the repetition quantity of the data channel to the index of the repetition quantity of the data channel, a quantity of bits used to indicate the repetition quantity of the data channel in the PDCCH can be effectively reduced, for example, reduced from 3 bits to 2 bits.

Information used to indicate the second MCS index, index information used to indicate the quantity of the time units for transmitting the data channel, and index information used to indicate the repetition quantity of the data channel that are included in the second control information, may be independent fields, to be specific, the second control information includes a second MCS index value field, an index value field of the quantity of the time units for transmitting the data channel, and an index field of the repetition quantity of the data channel. In this case, it may also be understood that the second control information includes the second MCS index, the index of the quantity of the time units for transmitting the data channel, and the repetition quantity of the data channel. The second control information may alternatively include a field used to indicate at least two of the second MCS index, the index of the quantity of the time units for transmitting the data channel, and the index of the repetition quantity of the data channel. For example, joint coding or joint mapping may be performed on at least two of the second MCS index, the index of the quantity of the time units for transmitting the data channel, and the index of the repetition quantity of the data channel.

It may be understood that the second control information may further include index information of a modulation order, index information of a transport block size, and index information of a bit rate of the data channel. The network device determines the index information of the modulation order, the index information of the transport block size, and the index information of the bit rate of the data channel in the second control information based on the quantity of the CCEs for transmitting the PDCCH and the modulation order, the transport block size, and the bit rate of the data channel in the first control information. Similar to the foregoing method for determining the information about the second MCS index, the method is not described in detail herein again.

Optionally, the network device may further determine the second control information based on the resource mapping manners of the CCEs, to be specific, determine the second control information based on the size of the resource for transmitting the control channel, the resource mapping manners of the CCEs, and the first control information. The resource mapping manners of the CCEs herein include the discrete resource mapping manner shown in FIG. 4 and the localized resource mapping manner shown in FIG. 5. In specific implementation, two independent mapping relationships shown in Table 3 to Table 8 may be defined for each of the discrete resource mapping manner and the localized resource mapping manner, so that the network device and the terminal device can determine the second control information based on the size of the resource for transmitting the control channel, the resource mapping manners of the CCEs, and the first control information. The resource mapping manners of the CCEs may be predefined in a protocol, or may be notified by the network device to the terminal device by using signaling.

S640. The network device sends the control channel, where the control channel carries the second control information.

After coding and modulating the second control information, the network device sends the second control information to the terminal device through the control channel.

The network device codes and modulates data based on the first control information, and then sends coded and modulated data to the terminal device through the data channel.

S650. The terminal device receives the control channel, detects the control channel, and determines the size of the resource for transmitting the control channel.

Specifically, the terminal device receives the control channel, and performs blind detection on the PDCCH in search spaces at different aggregation levels, to determine whether there is a PDCCH that is sent to the terminal device, and determine the size of the resource for transmitting the PDCCH. An aggregation level supported by the terminal device is agreed in a protocol or configured by the network device for the terminal device by using signaling.

S660. After obtaining the PDCCH in a search space through blind detection, the terminal device demodulates and decodes the PDCCH to obtain the second control information, and determines the first control information based on the second control information and the size of the resource.

Optionally, when the network device determines the second control information based on the size of the resource for transmitting the control channel, the resource mapping manners of the CCEs, and the first control information, the terminal device may determine the first control information based on the size of the resource for transmitting the control channel, the resource mapping manners of the CCEs, and the second control information.

For how the terminal device specifically determines the first control information, directly refer to step S630. Specific descriptions are as follows.

When the first control information includes the first MCS index and the second control information includes first indication information, the terminal device may determine the first MCS index based on the size of the resource for transmitting the control channel and the second MCS index.

The second MCS index may be an offset of the first MCS index on the basis of a reference value of an MCS index, and the reference value of the MCS index is determined based on the size of the resource for transmitting the control channel. Table 3 shows the possible mapping relationship between the reference value of the MCS index and the size of the resource for transmitting the control channel. After obtaining the size of the resource for transmitting the control channel, the terminal device determines the reference value of the MCS index based on the mapping relationship between the reference value of the MCS index and the size of the resource for transmitting the control channel, and then may determine the first MCS index based on the reference value of the MCS index and the second MCS index.

Alternatively, the second MCS index may be an index of the first MCS index. Table 4 shows the possible mapping relationship among the size of the resource for transmitting the control channel, the first MCS index, and the second MCS index. After obtaining the size of the resource for transmitting the control channel, the terminal device may determine the first MCS index based on the size of the resource for transmitting the control channel, the second MCS index, and the mapping relationship among the size of the resource for transmitting the control channel, the first MCS index, and the second MCS index.

When the first control information includes the quantity of the time units for transmitting the data channel and the second control information includes the second indication information, the terminal device may determine, based on the size of the resource for transmitting the control channel and the index of the quantity of the time units for transmitting the data channel, the quantity of the time units for transmitting the data channel.

The index of the quantity of the time units for transmitting the data channel may be an offset of the quantity of the time units for transmitting the data channel on the basis of a reference value of the quantity of the time units, and the reference value of the quantity of the time units is determined based on the size of the resource for transmitting the control channel. Table 5 shows the possible mapping relationship between the size of the resource for transmitting the control channel and the reference value of the quantity of the time units for transmitting the data channel. After obtaining the size of the resource for transmitting the control channel, the terminal device determines, based on the mapping relationship between the size of the resource for transmitting the control channel and the reference value of the quantity of the time units for transmitting the data channel, the reference value of the quantity of the time units for transmitting the data channel, and then determines the quantity of the time units for transmitting the data channel based on the reference value of the quantity of the time units for transmitting the data channel and the index of the quantity of the time units for transmitting the data channel.

Alternatively, the index of the quantity of the time units for transmitting the data channel may have the mapping relationship shown in Table 6, with the size of the resource for transmitting the control channel and the quantity of the time units for transmitting the data channel. After obtaining the size of the resource for transmitting the control channel, the terminal device may determine the quantity of the time units for transmitting the data channel, based on the size of the resource for transmitting the control channel, the index of the quantity of the time units for transmitting the data channel, and the mapping relationship among the size of the resource for transmitting the control channel, the quantity of the time units for transmitting the data channel, and the index of the quantity of the time units for transmitting the data channel.

When the first control information includes the repetition quantity of the data channel and the second control information includes the third indication information, the terminal device may determine the repetition quantity of the data channel based on the size of the resource for transmitting the control channel and the index of the repetition quantity of the data channel.

The index of the repetition quantity of the data channel may be an offset of the repetition quantity of the data channel on the basis of a reference value of the repetition quantity, and the reference value of the repetition quantity is determined based on the size of the resource for transmitting the control channel. Table 7 shows the possible mapping relationship between the size of the resource for transmitting the control channel and the reference value of the repetition quantity. After obtaining the size of the resource for transmitting the control channel, the terminal device determines the reference value of the repetition quantity based on the mapping relationship between the size of the resource for transmitting the control channel and the reference value of the repetition quantity, and then may determine the repetition quantity of the data channel based on the reference value of the repetition quantity and the index of the repetition quantity of the data channel.

Alternatively, the index of the repetition quantity of the data channel may have the mapping relationship shown in Table 8, with the size of the resource for transmitting the control channel and the repetition quantity of the data channel. After obtaining the size of the resource for transmitting the control channel, the terminal device may determine the repetition quantity of the data channel, based on the size of the resource for transmitting the control channel, the index of the repetition quantity of the data channel, and the mapping relationship among the size of the resource for transmitting the control channel, the repetition quantity of the data channel, and the index of the repetition quantity of the data channel.

After obtaining the first control information, the terminal device may demodulate and decode data on the data channel based on the first control information.

Figure 6A:
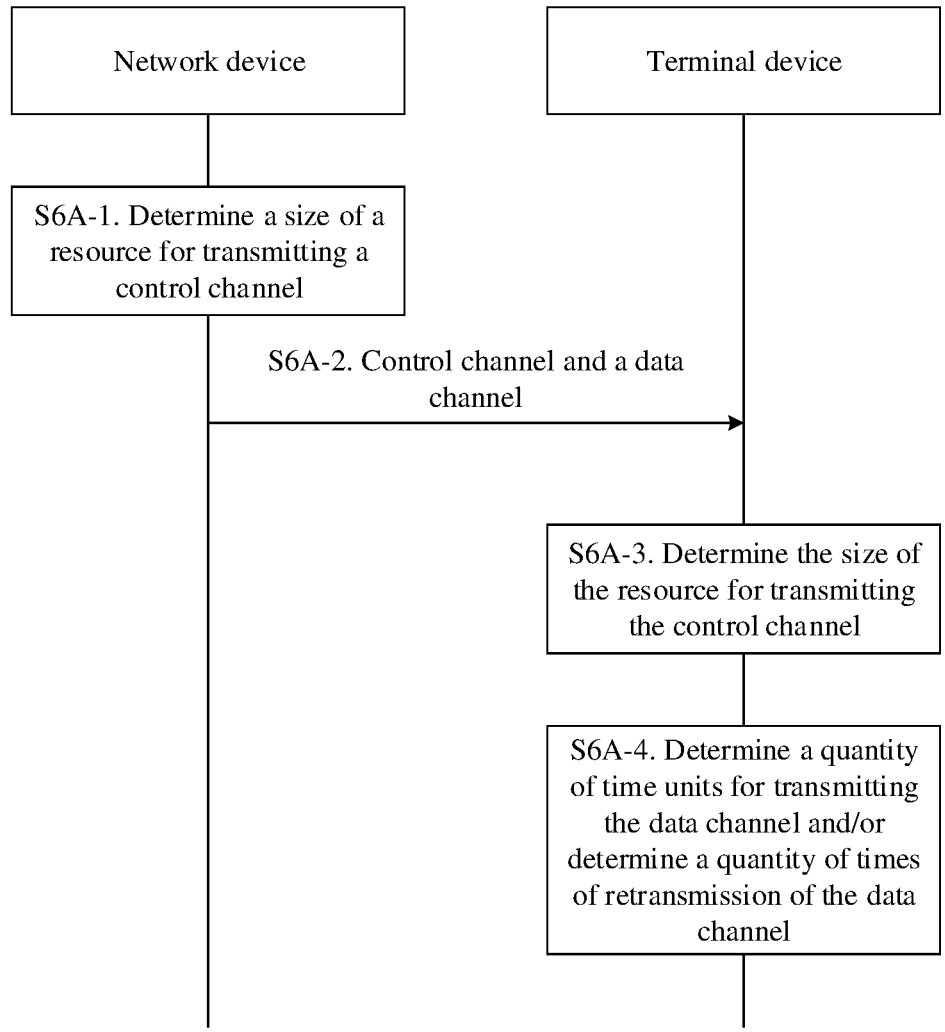
FIG. 6A is a schematic diagram of a communication method according to an embodiment of this application.

In the foregoing embodiment, information about the quantity of the time units for transmitting the data channel and information about the quantity of times of retransmission of the data channel are explicitly sent to the terminal device by using the second control information. As shown in FIG. 6A, this application further provides a communication method. A quantity of time units for transmitting a data channel and a quantity of times of retransmission of the data channel are implicitly indicated by using a size of a resource for transmitting a control channel. In this application, the quantity of times of retransmission of the data channel and a repetition quantity of the data channel may be equivalently exchanged.

S6A-1. A network device determines the size of the resource for transmitting the control channel, where the control channel carries a first parameter, and the first parameter is used to control transmission of data on the data channel. The first parameter may include information such as an MCS and a TBS. For more detailed descriptions of the control channel and the data channel, refer to related descriptions of the control channel and the data channel in the foregoing basic concept descriptions. For the size of the resource for transmitting the control channel and how to determine the size of the resource for transmitting the control channel, refer to step S620.

The size of the resource for transmitting the control channel reflects radio channel quality to some extent, and both the quantity of the time units for transmitting the data channel and the quantity of times of retransmission of the data channel reflect radio channel quality to some extent. Therefore, in a possible solution, a first mapping relationship is established between the size of the resource for transmitting the control channel and the quantity of times of retransmission of the data channel, a second mapping relationship is established between the size of the resource for transmitting the control channel and the quantity of the time units for transmitting the data channel, and the first mapping relationship and/or the second mapping relationship may be predefined, or may be semi-statically configured to the terminal device by using RRC signaling, so that a quantity of bits of a first parameter can be reduced.

Optionally, the first mapping relationship exists between the size of the resource for transmitting the control channel and the quantity of times of retransmission of the data channel, as shown in Table 9.

TABLE 9

| Size of a resource for transmitting a control channel | Quantity of times of retransmission of a data channel |
| --- | --- |
| 1 | 1 |
| 2 | 2 |
| 4 | 4 |
| 8 | 8 |
| 16 | 16 |
| 32 | 32 |

Optionally, the second mapping relationship exists between the size of the resource for transmitting the control channel and the quantity of the time units for transmitting the data channel, as shown in Table 10.

TABLE 10

| Size of a resource for transmitting a control channel | Quantity of time units for transmitting a data channel |
| --- | --- |
| 1 | 1 |
| 2 | 2 |
| 4 | 4 |
| 8 | 8 |
| 16 | 16 |
| 32 | 32 |

It may be understood that specific values in Table 9 and Table 10 are merely examples of the first mapping relationship and the second mapping relationship and are not intended to limit this embodiment of this application.

S6A-2. The network device sends the control channel and the data channel. Specifically, the network device sends the control channel based on the determined size of the resource for transmitting the control channel, and sends the data channel based on the determined time units for transmitting the data channel and/or the determined quantity of times of retransmission of the data channel.

S6A-3. The terminal device receives the control channel, detects the control channel, and determines the size of the resource for transmitting the control channel. For a more specific description, refer to S650.

S6A-4. The terminal device determines the quantity of the time units for transmitting the data channel, based on the mapping relationship between the size of the resource for transmitting the control channel and the quantity of the time units for transmitting the data channel, and the size of the resource for transmitting the control channel; and/or the terminal device determines the quantity of times of retransmission of the data channel based on the mapping relationship between the size of the resource for transmitting the control channel and the quantity of times of retransmission of the data channel, and the size of the resource for transmitting the control channel.

In the method, the quantity of the time units for transmitting the data channel and/or the quantity of times of retransmission of the data channel do/does not need to be indicated to the terminal device by using the first parameter in the control channel. Therefore, a payload size of the control channel is effectively reduced, and transmission efficiency and reliability of the control channel are improved.

It may be understood that, related terms in the method embodiment shown in FIG. 6A and related terms in the method embodiment shown in FIG. 6A may be interchangeably used, and the related method embodiments may further be combined with each other to form a new method embodiment based on an internal logical relationship thereof.

In the foregoing embodiments provided in this application, the communication method according to the embodiments of this application is described from perspectives of the network device used as a sending device, the terminal device used as a receiving device, and interaction between the sending device and the receiving device. It may be understood that, to implement the foregoing functions, the devices such as the sending device and the receiving device include a corresponding hardware structure and/or a software module for performing the functions. A person of ordinary skill in the art should be easily aware that, in combination with the examples described in the embodiments disclosed in this specification, units and method steps may be implemented by hardware or a combination of hardware and computer software in this application.

Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 7:
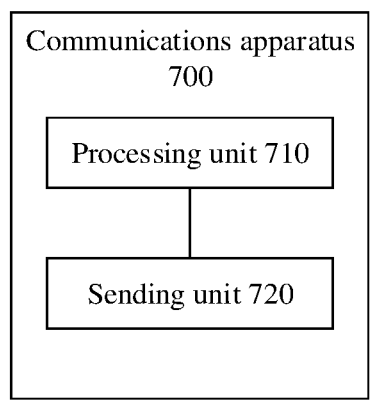
FIG. 7 is a schematic structural diagram of a communications apparatus according to an embodiment of this application.
Figure 8:
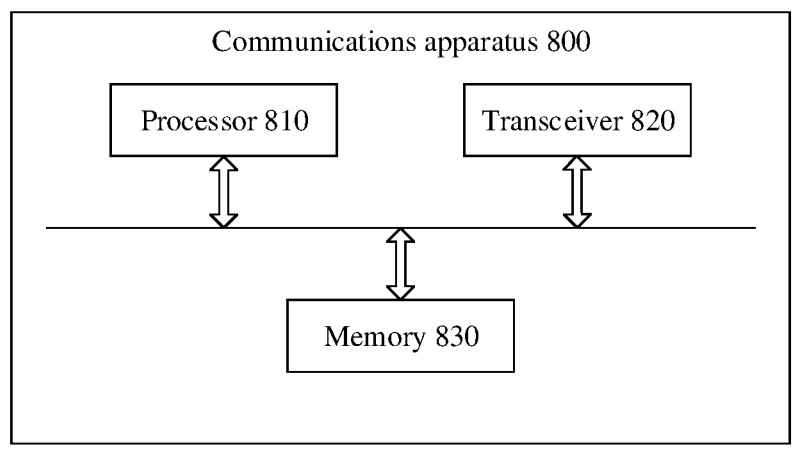
FIG. 8 is a schematic structural diagram of another communications apparatus according to an embodiment of this application.

FIG. 7 and FIG. 8 are schematic structural diagrams of two possible communications apparatuses according to the embodiments of this application. Each communications apparatus implements a function of the network device used as a sending device in the foregoing method embodiments shown in FIG. 6 and FIG. 6A, and therefore can also achieve the beneficial effects in the foregoing method embodiments. In this embodiment of this application, the communications apparatus may be the radio access network device 120 shown in FIG. 1.

As shown in FIG. 7, a communications apparatus 700 includes a processing unit 710 and a sending unit 720.

Corresponding to the method embodiment shown in FIG. 6, the following apparatus embodiment is provided.

The processing unit 710 is configured to determine first control information, where the first control information is used to control transmission of data on a data channel. The processing unit 710 is further configured to determine a size of a resource for transmitting a control channel, where the control channel is used to carry second control information. The processing unit 710 is further configured to determine the second control information based on the size of the resource and the first control information.

The sending unit 720 is configured to send the second control information on the control channel.

When the first control information includes a first modulation and coding scheme index and the second control information includes information about a second modulation and coding scheme index, the processing unit 710 is further configured to determine the second modulation and coding scheme index based on the size of the resource for transmitting the control channel and the first modulation and coding scheme index. The second modulation and coding scheme index may be an index of the first modulation and coding scheme index.

When the first control information includes a quantity of time units for transmitting the data channel and the second control information includes index information of the quantity of the time units for transmitting the data channel, the processing unit 710 is further configured to determine, based on the size of the resource and the quantity of the time units for transmitting the data channel in the first control information, the index information of the quantity of the time units for transmitting the data channel in the second control information.

The size of the resource for transmitting the control channel is a quantity of control channel elements used for transmitting the control channel or a quantity of times of retransmission of the control channel.

When the quantity of the control channel elements used to transmit the control channel is greater than 1, the control channel elements belong to at least one control resource set.

Corresponding to the method embodiment shown in FIG. 6A, the following apparatus embodiment is provided.

A processing unit 710 is configured to determine a size of a resource for transmitting a control channel, where the control channel carries a first parameter, and the first parameter is used to control transmission of data on a data channel. A first mapping relationship exists between the size of the resource for transmitting the control channel and a quantity of times of retransmission of the data channel; and/or a second mapping relationship exists between the size of the resource for transmitting the control channel and a quantity of time units for transmitting the data channel.

A sending unit 720 is configured to send the control channel and the data channel.

The first mapping relationship is predefined, or the sending unit 720 is further configured to notify a terminal device of the first mapping relationship by using a radio resource control message.

The second mapping relationship is predefined, or the sending unit 720 is further configured to notify the terminal device of the first mapping relationship by using a radio resource control message.

The size of the resource for transmitting the control channel is a quantity of control channel elements used to transmit the control channel, or a quantity of times of retransmission of the control channel, or a product of the quantity of the control channel elements used to transmit the control channel and the quantity of times of retransmission of the control channel.

When the quantity of the control channel elements used to transmit the control channel is greater than 1, the control channel elements belong to at least one control resource set.

The quantity of times of retransmission of the control channel is a quantity of times of retransmission of the control channel in time domain, or a quantity of times of retransmission of the control channel in frequency domain.

As shown in FIG. 8, a communications apparatus 800 includes a processor 810, a transceiver 820, and a memory 830. The memory 830 may be configured to store code executed by the processor 810. Components in the communications apparatus 800 communicate with each other through an internal connection path, for example, transfer a control and/or data signal through a bus. The processor 810 is configured to perform a function of the processing unit 710, and the transceiver 820 is configured to perform a function of the sending unit 720.

For other function descriptions of the processing unit 710, the processor 810, the sending unit 720, and the transceiver 820, directly refer to the method embodiments shown in FIG. 6 and FIG. 6A. An information sending function in the foregoing method embodiments is implemented by the sending unit 720 or the transceiver 820, and other data processing functions are all implemented by the processing unit 710 or the processor 810. Details are not described herein.

Figure 9:
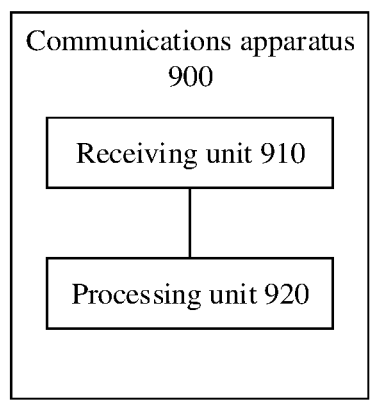
FIG. 9 is a schematic structural diagram of another communications apparatus according to an embodiment of this application.
Figure 10:
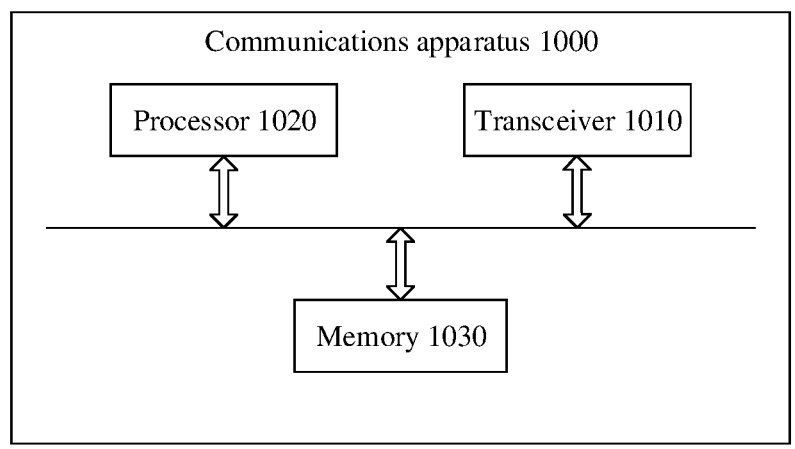
FIG. 10 is a schematic structural diagram of another communications apparatus according to an embodiment of this application.

FIG. 9 and FIG. 10 are schematic structural diagrams of other two possible communications apparatuses according to the embodiments of this application. Each communications apparatus implements a function of a terminal device used as a receiving device in the foregoing method embodiments shown in FIG. 6 and FIG. 6A, and therefore, can also achieve the beneficial effects in the foregoing method embodiments. In this embodiment of this application, the communications apparatus may be the terminal device 130 or the terminal device 140 shown in FIG. 1.

As shown in FIG. 9, a communications apparatus 900 includes a receiving unit 910 and a processing unit 920.

Corresponding to the method embodiment shown in FIG. 6, the following apparatus embodiment is provided.

The receiving unit 910 is configured to receive a control channel, where the control channel is used to carry second control information.

The processing unit 920 is configured to detect the control channel, and determine a size of a resource for transmitting the control channel.

The processing unit 920 is further configured to obtain the second control information by using the control channel, and determine first control information based on the second control information and the size of the resource, where the first control information is used to control transmission of data on a data channel.

When the first control information includes a first modulation and coding scheme index and the second control information includes information about a second modulation and coding scheme index, the processing unit 920 is further configured to determine the first modulation and coding scheme index based on the size of the resource for transmitting the control channel and the second modulation and coding scheme index. The second modulation and coding scheme index may be an index of the first modulation and coding scheme index.

When the first control information includes a quantity of time units for transmitting the data channel and the second control information includes index information of the quantity of the time units for transmitting the data channel, the processing unit 920 is further configured to determine, based on the size of the resource and the index information of the quantity of the time units for transmitting the data channel in the second control information, the quantity of the time units for transmitting the data channel in the first control information.

The size of the resource for transmitting the control channel is a quantity of control channel elements used for transmitting the control channel or a quantity of times of retransmission of the control channel.

When the quantity of the control channel elements used to transmit the control channel is greater than 1, the control channel elements belong to at least one control resource set.

Corresponding to the method embodiment shown in FIG. 6A, the following apparatus embodiment is provided.

A receiving unit 910 is configured to receive a control channel, where the control channel carries a first parameter, and the first parameter is used to control transmission of data on a data channel.

A processing unit 920 is configured to detect the control channel, and determine a size of a resource for transmitting the control channel.

The processing unit 920 is further configured to determine a quantity of times of retransmission of the data channel based on a first mapping relationship and the size of the resource for transmitting the control channel, where the first mapping relationship is a mapping relationship between the size of the resource for transmitting the control channel and the quantity of times of retransmission of the data channel; and/or the processing unit 920 is further configured to determine, based on a second mapping relationship and the size of the resource for transmitting the control channel, a quantity of time units for transmitting the data channel, where the second mapping relationship is a mapping relationship between the size of the resource for transmitting the control channel and the quantity of the time units for transmitting the data channel.

The receiving unit 910 is further configured to receive the data channel based on the quantity of times of retransmission of the data channel and/or the quantity of the time units for transmitting the data channel.

The first mapping relationship is predefined, or the receiving unit 910 is further configured to obtain the first mapping relationship by receiving a radio resource control message from a network device.

The second mapping relationship is predefined, or the receiving unit 910 is further configured to obtain the first mapping relationship by receiving a radio resource control message from the network device.

The size of the resource for transmitting the control channel is a quantity of control channel elements used to transmit the control channel, or a quantity of times of retransmission of the control channel, or a product of the quantity of the control channel elements used to transmit the control channel and the quantity of times of retransmission of the control channel.

When the quantity of the control channel elements used to transmit the control channel is greater than 1, the control channel elements belong to at least one control resource set.

The quantity of times of retransmission of the control channel is a quantity of times of retransmission of the control channel in time domain, or a quantity of times of retransmission of the control channel in frequency domain.

As shown in FIG. 10, a communications apparatus 1000 includes a processor 1020, a transceiver 1010, and a memory 1030. The memory 1030 may be configured to store code executed by the processor 1020. Components in the communications apparatus 1000 communicate with each other through an internal connection path, for example, transfer a control and/or data signal through a bus. The processor 1020 is configured to perform a function of the processing unit 920, and the transceiver 1010 is configured to perform a function of the receiving unit 910.

For other function descriptions of the receiving unit 910, the transceiver 1010, the processing unit 920, and the processor 1020, directly refer to the method embodiments shown in FIG. 6 and FIG. 6A. An information receiving function in the foregoing method embodiment is implemented by the receiving unit 910 or the transceiver 1010, and remaining data processing functions are all implemented by the processing unit 920 or the processor 1020. Details are not described herein.

It may be understood that, FIG. 8 and FIG. 10 each show merely a design of the communications apparatus. During actual application, the communications apparatus may include any quantity of receivers and any quantity of processors, and all communications apparatuses that can implement the embodiments of this application fall within the protection scope of this application.

The apparatus embodiments shown in FIG. 7 to FIG. 10 are obtained with reference to some method embodiments shown in FIG. 6 and FIG. 6A. It may be understood that, apparatus embodiments corresponding to other method embodiments of this application may be correspondingly obtained by referring to the other method embodiments of this application and the apparatus embodiments shown in FIG. 7 to FIG. 10. Details are not described herein.

It may be understood that, when the embodiments of this application are applied to a network device chip, the network device chip implements a function of the network device in the foregoing method embodiments. The network device chip sends the second control information to another module (such as a radio frequency module or an antenna) in the network device. The second control information is sent to the terminal device by using another module of the network device.

When the embodiments of this application are applied to a terminal device chip, the terminal device chip implements a function of the terminal device in the foregoing method embodiments. The terminal device chip receives the second control information from another module (for example, a radio frequency module or an antenna) in the terminal device, and the second control information is sent by the network device to the terminal device.

The methods and the apparatuses in the embodiments of this application are applicable to transmission of control information of a URLLC service, but are not intended to limit an application scope of this application. The methods and the apparatuses in the embodiments of this application are also applicable to transmission of control information of an mMTC service and an eMBB service.

It should be noted that the processor in the embodiments of this application may be a central processing unit (CPU), may be another general-purpose processor, a digital signal processor (DSP), an application-specific integrated circuit (ASIC), a field programmable gate array (FPGA), or another programmable logical device, a transistor logical device, a hardware component, or a combination thereof. The general purpose processor may be a microprocessor or any regular processor or the like.

The method steps in the embodiments of this application may be implemented by hardware, or may be implemented by a processor by executing a software instruction. The software instruction may include a corresponding software module. The software module may be stored in a random access memory (RAM), a flash memory, a read-only memory (ROM), a programmable read only memory (PROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a sending device or a receiving device. Certainly, the processor and the storage medium may alternatively exist in a sending device or a receiving device as discrete components.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or other programmable apparatuses. The computer instruction may be stored in a computer readable storage medium, or may be transmitted by using the computer readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

The term "a plurality of" in this specification means two or more than two. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. In the formula, the character "/" indicates a "division" relationship between the associated objects.

It may be understood that numerical symbols in the embodiments of this application are differentiated merely for ease of description, but are not intended to limit this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

What is claimed is:

1. A method, comprising:
receiving, by a terminal device from a network device, a control channel;
detecting, by the terminal device, the control channel;
determining, by the terminal device, a size of a resource for transmitting the control channel by the network device, wherein the control channel carries a first parameter, and the first parameter is used to control transmission of data on a data channel;
determining, by the terminal device, a quantity of times of retransmission of the data channel based on mapping relationships and the size of the resource for transmitting the control channel, wherein the mapping relationships map each control channel resource size of a plurality of control channel resource sizes to a different data channel retransmission number of a plurality of data channel retransmission numbers, wherein the plurality of control channel resource sizes are positively mapped to the plurality of data channel retransmission numbers, and wherein the mapping relationships include a first mapping relationship mapping the size of the resource for transmitting the control channel to the quantity of times of retransmission of the data channel; and
receiving, by the terminal device, the data channel based on the quantity of times of retransmission of the data channel.

2. The method according to claim 1, wherein the first mapping relationship is predefined, or obtained by the terminal device by receiving a radio resource control message from the network device.

3. The method according to claim 1, wherein the size of the resource for transmitting the control channel is a quantity of control channel elements used to transmit the control channel.

4. The method according to claim 1, wherein the size of the resource for transmitting the control channel is a quantity of times of retransmission of the control channel.

5. The method according to claim 1, wherein the size of the resource for transmitting the control channel is a product of a quantity of control channel elements used to transmit the control channel and a quantity of times of retransmission of the control channel.

6. The method according to claim 5, wherein the quantity of control channel elements used to transmit the control channel is greater than 1, and the control channel elements belong to at least one control resource set.

7. The method according to claim 5, wherein a quantity of times of retransmission of the control channel is a quantity of times of retransmission of the control channel in time domain.

8. The method according to claim 5, wherein a quantity of times of retransmission of the control channel is a quantity of times of retransmission of the control channel in frequency domain.

9. The method of claim 1, wherein the control channel is a physical downlink control channel (PDCCH), wherein the data channel is a physical downlink shared channel (PDSCH), and wherein the size of the resource for transmitting the control channel is a quantity of control channel elements (CCES) used for carrying the PDCCH.

10. The method of claim 1,
wherein the mapping relationships further include a second mapping relationship mapping a second size of a second resource for transmitting the control channel to a second quantity of times of retransmission of the data channel,
the size of the resource being smaller than the second size of the second resource, the quantity of times of retransmission of the data channel being smaller than the of the second quantity of times of retransmission of the data channel, and
wherein the determining the quantity of times of retransmission of the data channel comprises:
finding, by the terminal device, the first mapping relationship from the mapping relationships based on the size of the resource for transmitting the control channel; and
determining, by the terminal device, the quantity of times of retransmission of the data channel in the first mapping relationship.

11. An apparatus, comprising:
a receiver, configured to:
receive a control channel from a network device, wherein the control channel carries a first parameter, and the first parameter is used to control transmission of data on a data channel; and
at least one processor; and
a non-transitory computer-readable storage medium storing a program to be executed by the at least one processor, the program including instructions for:
detecting the control channel; and
determining a size of a resource for transmitting the control channel by the network device; and
determining a quantity of times of retransmission of the data channel based on mapping relationships and the size of the resource for transmitting the control channel, wherein the mapping relationships map each control channel resource size of a plurality of control channel resource sizes to a different data channel retransmission number of a plurality of data channel retransmission numbers, wherein the plurality of control channel resource sizes are positively mapped to the plurality of data channel retransmission numbers, and wherein the mapping relationships include a first mapping relationship mapping the size of the resource for transmitting the control channel to the quantity of times of retransmission of the data channel; and
wherein the receiver is further configured to receive the data channel based on the quantity of times of retransmission of the data channel.

12. The apparatus according to claim 11, wherein the first mapping relationship is predefined.

13. The apparatus according to claim 11, wherein the receiver is further configured to obtain the first mapping relationship by receiving a radio resource control message from the network device.

14. The apparatus according to claim 11, wherein the size of the resource for transmitting the control channel is a quantity of control channel elements used to transmit the control channel.

15. The apparatus according to claim 11, wherein the size of the resource for transmitting the control channel is a quantity of times of retransmission of the control channel.

16. The apparatus according to claim 11, wherein the size of the resource for transmitting the control channel is a product of a quantity of control channel elements used to transmit the control channel and a quantity of times of retransmission of the control channel.

17. The apparatus according to claim 16, wherein the quantity of control channel elements used to transmit the control channel is greater than 1, and the control channel elements belong to at least one control resource set.

18. The apparatus according to claim 16, wherein the quantity of times of retransmission of the control channel is a quantity of times of retransmission of the control channel in time domain, or a quantity of times of retransmission of the control channel in frequency domain.

19. An apparatus, comprising:
at least one processor; and
a non-transitory computer-readable storage medium storing a program to be executed by the at least one processor, the program including instructions for:
determining a size of a resource for transmitting a control channel, wherein the control channel carries a first parameter, the first parameter is used to control transmission of data on a data channel, and a first mapping relationship of mapping relationships exists between the size of the resource for transmitting the control channel and a quantity of times of retransmission of the data channel, wherein the mapping relationships map each control channel resource size of a plurality of control channel resource sizes to a different data channel retransmission number of a plurality of data channel retransmission numbers, and wherein the plurality of control channel resource sizes are positively mapped to the plurality of data channel retransmission numbers; and
sending the control channel and the data channel.

20. The apparatus according to claim 19, wherein the first mapping relationship is predefined, or the program further includes instructions for notifying a terminal device of the first mapping relationship using a radio resource control message.

21. The apparatus according to claim 19, wherein the size of the resource for transmitting the control channel is a quantity of control channel elements used to transmit the control channel, or a quantity of times of retransmission of the control channel, or a product of the quantity of the control channel elements used to transmit the control channel and the quantity of times of retransmission of the control channel.

22. The apparatus according to claim 21, wherein the quantity of the control channel elements used to transmit the control channel is greater than 1, and the control channel elements belong to at least one control resource set.

* * * * *